(12) United States Patent
Vaikhanski et al.

(10) Patent No.: US 11,390,056 B2
(45) Date of Patent: Jul. 19, 2022

(54) LOW DENSITY MICROSPHERES

(71) Applicant: TECHNION RESEARCH & DEVELOPMENT FOUNDATION LTD., Haifa (IL)

(72) Inventors: Lev Vaikhanski, Nesher (IL); Yachin Cohen, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 59 days.

(21) Appl. No.: 17/073,570

(22) Filed: Oct. 19, 2020

(65) Prior Publication Data

US 2021/0032431 A1 Feb. 4, 2021

Related U.S. Application Data

(62) Division of application No. 15/525,656, filed as application No. PCT/IL2015/051090 on Nov. 11, 2015, now Pat. No. 10,808,094.

(30) Foreign Application Priority Data

Nov. 11, 2014 (GB) ...................................... 1420055

(51) Int. Cl.
*C08J 9/22* (2006.01)
*C08J 9/228* (2006.01)
(Continued)

(52) U.S. Cl.
CPC .......... *B32B 17/06* (2013.01); *B29C 44/1209* (2013.01); *B29C 44/3461* (2013.01);
(Continued)

(58) Field of Classification Search
CPC .. B32B 17/06; B32B 3/12; B32B 3/26; B32B 3/266; B32B 5/022; B32B 5/024;
(Continued)

(56) References Cited

U.S. PATENT DOCUMENTS 3,257,103 A 6/1966 Brockhues
4,256,790 A 3/1981 Lackman et al.
(Continued)

FOREIGN PATENT DOCUMENTS

EP 0896976 A1 2/1999
EP 1149628 A1 10/2001
(Continued)

OTHER PUBLICATIONS

Nouryon, "Product specification Expancel DU," Mar. 2022. (Year: 2022).*

(Continued)

*Primary Examiner* — Kara B Boyle
(74) *Attorney, Agent, or Firm* — The Roy Gross Law Firm, LLC; Roy Gross

(57) ABSTRACT

Low-density thermoplastic expandable microspheres are disclosed. Various low-density structures, in particular, sandwich panels, based on foam prepared from the low-density microspheres, are also disclosed. Process of preparing low-density polymeric microspheres, per se, and the corresponding low-density structures, based on the microsphere foam, are also disclosed.

10 Claims, 5 Drawing Sheets

(51) Int. Cl.
| | |
|---|---|
| C08J 9/32 | (2006.01) |
| C08K 3/04 | (2006.01) |
| B32B 3/12 | (2006.01) |
| B32B 17/06 | (2006.01) |
| B29C 44/12 | (2006.01) |
| C08J 9/24 | (2006.01) |
| B29C 70/66 | (2006.01) |
| B29C 44/34 | (2006.01) |
| B32B 27/38 | (2006.01) |
| B32B 5/02 | (2006.01) |
| B32B 7/12 | (2006.01) |
| B32B 27/14 | (2006.01) |
| B32B 15/14 | (2006.01) |
| B32B 27/28 | (2006.01) |
| B32B 27/34 | (2006.01) |
| B32B 27/12 | (2006.01) |
| B32B 5/26 | (2006.01) |
| B32B 5/30 | (2006.01) |
| B32B 5/24 | (2006.01) |
| B32B 3/26 | (2006.01) |
| B32B 5/16 | (2006.01) |
| B32B 9/04 | (2006.01) |
| B29C 44/44 | (2006.01) |
| B32B 5/20 | (2006.01) |
| B32B 15/04 | (2006.01) |
| B32B 15/08 | (2006.01) |
| B32B 15/20 | (2006.01) |
| B32B 27/06 | (2006.01) |
| B32B 27/08 | (2006.01) |
| B32B 27/42 | (2006.01) |
| C08J 5/04 | (2006.01) |
| C08J 9/232 | (2006.01) |
| E04C 2/284 | (2006.01) |
| B29K 105/12 | (2006.01) |
| B29K 105/04 | (2006.01) |
| B29K 27/06 | (2006.01) |
| B29K 33/00 | (2006.01) |
| B29K 75/00 | (2006.01) |
| B29L 31/34 | (2006.01) |
| B29K 677/00 | (2006.01) |
| B29K 79/00 | (2006.01) |
| B29K 681/00 | (2006.01) |
| B29K 509/08 | (2006.01) |
| B29K 667/00 | (2006.01) |
| B29K 671/00 | (2006.01) |
| B29K 507/00 | (2006.01) |
| B29K 507/04 | (2006.01) |
| B29K 679/00 | (2006.01) |
| B32B 7/09 | (2019.01) |
| B29K 101/12 | (2006.01) |
| B29L 9/00 | (2006.01) |

(52) U.S. Cl.
CPC .......... *B29C 44/445* (2013.01); *B29C 70/66* (2013.01); *B32B 3/12* (2013.01); *B32B 3/26* (2013.01); *B32B 3/266* (2013.01); *B32B 5/022* (2013.01); *B32B 5/024* (2013.01); *B32B 5/16* (2013.01); *B32B 5/20* (2013.01); *B32B 5/245* (2013.01); *B32B 5/26* (2013.01); *B32B 5/30* (2013.01); *B32B 7/12* (2013.01); *B32B 9/045* (2013.01); *B32B 15/046* (2013.01); *B32B 15/08* (2013.01); *B32B 15/14* (2013.01); *B32B 15/20* (2013.01); *B32B 17/066* (2013.01); *B32B 17/067* (2013.01); *B32B 27/065* (2013.01); *B32B 27/08* (2013.01); *B32B 27/12* (2013.01); *B32B 27/14* (2013.01); *B32B 27/28* (2013.01); *B32B 27/281* (2013.01); *B32B 27/286* (2013.01); *B32B 27/288* (2013.01); *B32B 27/34* (2013.01); *B32B 27/38* (2013.01); *B32B 27/42* (2013.01); *C08J 5/042* (2013.01); *C08J 5/046* (2013.01); *C08J 9/22* (2013.01); *C08J 9/232* (2013.01); *C08J 9/24* (2013.01); *C08J 9/32* (2013.01); *C08K 3/041* (2017.05); *E04C 2/284* (2013.01); B29C 44/1285 (2013.01); B29K 2027/06 (2013.01); B29K 2033/12 (2013.01); B29K 2075/00 (2013.01); B29K 2079/08 (2013.01); B29K 2101/12 (2013.01); B29K 2105/048 (2013.01); B29K 2105/12 (2013.01); B29K 2105/124 (2013.01); B29K 2507/00 (2013.01); B29K 2507/04 (2013.01); B29K 2509/08 (2013.01); B29K 2667/006 (2013.01); B29K 2671/00 (2013.01); B29K 2677/00 (2013.01); B29K 2679/08 (2013.01); B29K 2681/06 (2013.01); B29K 2995/0002 (2013.01); B29K 2995/0011 (2013.01); B29K 2995/0063 (2013.01); B29L 2009/00 (2013.01); B29L 2031/34 (2013.01); B29L 2031/3456 (2013.01); *B32B 7/09* (2019.01); B32B 2250/40 (2013.01); B32B 2255/02 (2013.01); B32B 2255/06 (2013.01); B32B 2255/10 (2013.01); B32B 2255/20 (2013.01); B32B 2255/205 (2013.01); B32B 2255/26 (2013.01); B32B 2260/021 (2013.01); B32B 2260/046 (2013.01); B32B 2262/02 (2013.01); B32B 2262/0261 (2013.01); B32B 2262/0269 (2013.01); B32B 2262/0284 (2013.01); B32B 2262/101 (2013.01); B32B 2262/106 (2013.01); B32B 2264/025 (2013.01); B32B 2264/0228 (2013.01); B32B 2264/0242 (2013.01); B32B 2264/105 (2013.01); B32B 2264/107 (2013.01); B32B 2264/108 (2013.01); B32B 2264/12 (2013.01); B32B 2266/0214 (2013.01); B32B 2266/0228 (2013.01); B32B 2266/0235 (2013.01); B32B 2266/0242 (2013.01); B32B 2266/0264 (2013.01); B32B 2266/0278 (2013.01); B32B 2266/0285 (2013.01); B32B 2266/04 (2013.01); B32B 2266/104 (2016.11); B32B 2266/106 (2016.11); B32B 2307/202 (2013.01); B32B 2307/306 (2013.01); B32B 2307/558 (2013.01); B32B 2307/56 (2013.01); B32B 2307/72 (2013.01); B32B 2457/08 (2013.01); B32B 2571/00 (2013.01); B32B 2603/00 (2013.01); B32B 2605/12 (2013.01); B32B 2605/18 (2013.01); *C08J 2203/22* (2013.01); *C08J 2205/10* (2013.01); *C08J 2400/22* (2013.01); *C08J 2477/10* (2013.01); *C08K 2201/001* (2013.01); *C08K 2201/011* (2013.01)

(58) Field of Classification Search
CPC .. B32B 5/16; B32B 5/20; B32B 5/245; B32B 5/26; B32B 9/045; B32B 15/046; B32B 15/08; B32B 15/14; B32B 15/20; B32B 17/066; B32B 17/067; B32B 27/065; B32B 27/08; B32B 27/12; B32B 27/14; B32B 27/28; B32B 27/281; B32B 27/286; B32B 27/288; B32B 27/32; B32B 27/38; B32B 27/42; B32B 7/09; B32B 2250/40; B32B 2255/02; B32B 2255/06; B32B 2255/10; B32B 2255/20; B32B 2255/205;

B32B 2255/26; B32B 2260/021; B32B
2260/046; B32B 2262/02; B32B
2262/0261; B32B 2262/0269; B32B
2262/0284; B32B 2262/101; B32B
2262/106; B32B 2264/0228; B32B
2264/0242; B32B 2264/025; B32B
2264/105; B32B 2264/107; B32B
2264/108; B32B 2264/12; B32B
2266/0214; B32B 2266/0228; B32B
2266/0235; B32B 2266/0242; B32B
2266/0264; B32B 2266/0278; B32B
2266/0285; B32B 2266/04; B32B
2266/104; B32B 2266/106; B32B
2307/202; B32B 2307/306; B32B
2307/558; B32B 2307/56; B32B 2457/08;
B32B 2571/00; B32B 2603/00; B32B
2605/12; B32B 2605/18; B32B 7/08;
B29C 44/1209; B29C 44/3461; B29C
44/445; B29C 70/66; B29C 44/1285;
C08J 5/042; C08J 5/046; C08J 9/22;
C08J 9/232; C08J 9/24; C08J 9/32; C08J
2203/22; C08J 2205/10; C08J 2400/22;
C08J 2477/10; C08K 3/041; C08K
2201/001; C08K 2201/011; E04C 2/284;
B29K 2027/06; B29K 2033/12; B29K
2075/00; B29K 2079/08; B29K 2101/12;
B29K 2105/048; B29K 2105/12; B29K
2105/124; B29K 2507/00; B29K 2507/04;
B29K 2509/08; B29K 2667/006; B29K
2671/00; B29K 2677/00; B29K 2679/08;
B29K 2681/06; B29K 2995/002; B29K
2995/0011; B29K 2995/0063; B29L
2009/00; B29L 2031/34; B29L 2031/3456

See application file for complete search history.

(56) References Cited

U.S. PATENT DOCUMENTS

| 4,582,756 | A | 4/1986 | Niinuma et al. |
| 4,828,206 | A | 5/1989 | Bruno et al. |
| 5,180,752 | A | 1/1993 | Melber et al. |
| 5,308,228 | A | 5/1994 | Benoit et al. |
| 5,589,243 | A | 12/1996 | Day |
| 5,904,978 | A | 5/1999 | Hanrahan et al. |
| 6,187,411 | B1 | 2/2001 | Palmer |
| 6,431,837 | B1 | 8/2002 | Velicki |
| 6,613,810 | B1 | 9/2003 | Ejiri et al. |
| 6,740,381 | B2 | 5/2004 | Day et al. |
| 6,864,297 | B2 | 3/2005 | Nutt et al. |
| 7,393,577 | B2 | 7/2008 | Day et al. |
| 7,452,585 | B1 | 11/2008 | Wong et al. |
| 7,731,046 | B2 | 6/2010 | Johnson |
| 8,272,188 | B2 | 9/2012 | Johnson et al. |
| 8,288,447 | B2 | 10/2012 | Muenz et al. |
| 2003/0042642 | A1 | 3/2003 | Whinnery |
| 2005/0282014 | A1 | 12/2005 | Johnston et al. |
| 2006/0235095 | A1 | 10/2006 | Leberfinger et al. |
| 2006/0269800 | A1 | 11/2006 | Ogawa et al. |
| 2011/0039060 | A1* | 2/2011 | Shen .................. B32B 5/20 521/149 |
| 2014/0243438 | A1 | 8/2014 | Ejiri |

FOREIGN PATENT DOCUMENTS

| JP | H08207173 A | 8/1996 |
| WO | 2005017027 A1 | 2/2005 |
| WO | 2005026243 A1 | 3/2005 |
| WO | 2005066250 A1 | 7/2005 |
| WO | 2006009643 A2 | 1/2006 |

OTHER PUBLICATIONS

Stanley, Larry E. et al, "Development and Evaluation of Stitched Sandwich Panels", Jun. 2001, NASA/CR-2001-211025, University of Utah, Salt Lake City, Utah, US.

Written Opinion of PCT/IL2015/051090 Completed Feb. 29, 2016; dated Mar. 1, 2016 9 Pages.

International Search Report of PCT/IL2015/051090 Completed Feb. 29, 2016; dated Mar. 1, 2016 9 Pages.

\* cited by examiner

LOW DENSITY MICROSPHERES

CROSS REFERENCE TO RELATED APPLICATIONS

This application is a divisional of U.S. patent application Ser. No. 15/525,656, filed on May 10, 2017, which is a National Phase of PCT Patent Application No. PCT/IL2015/051090 having International filing date of Nov. 11, 2015, which claims the benefit of priority of United Kingdom Patent Application No. 1420055.4, filed on Nov. 11, 2014. The contents of the above applications are all incorporated by reference as if fully set forth herein in their entirety.

FIELD OF THE INVENTION

The present invention, in some embodiments thereof, relates to low-density structures and, more particularly, but not exclusively, to low-density polymeric microspheres, and methods of preparing same.

BACKGROUND OF THE INVENTION

The expandable microsphere is a material that can act as a blowing agent when mixed in a product and subsequently heated to cause expansion within the matrix. The expandable microspheres are off-white, can be 6 to 40 micrometers in average diameter and have a density of 900 to 1400 kg/m$^3$. The expandable microspheres are used as a blowing agent in products like, e.g., puff ink automotive underbody coatings or injection molding of thermoplastics. Typically, the product must be heated at some point in the process for the expandable microspheres to expand.

U.S. Pat. No. 5,180,752 discloses a technique for drying and expanding thermoplastic microspheres. However, the limit of expandability is taught to be at a density of 0.015 g/cm$^3$.

U.S. Pat. No. 6,864,297 describes process and properties for foam with density of 100 kg/m$^3$. Sandwich panels are laminated composites containing two stiff skins and light density core located between and bonded to the skins. Skins are typically based on fiber reinforced layer composites as well as ceramics or metals, or a combination thereof. Cores are based on light density foams including but not limited to polyurethane, styrene acrylonitrile (SAN) and polyvinyl chloride (PVC). Further, the core may be in a shape of light density honeycombs, balsa wood, truss or corrugated structures.

Sandwich panels are widely used in airspace, navy, high speed ground transportation, wind and gas turbine propellers, blast resistance, and engineering structures due to their light weight and their mechanical performance.

Sandwich panels operate as integrated skins-core structures and may be fractured due to compression or shear core failures, wrinkling of skins, or debonding skins from core. Mechanical performance of core and skins can be predicted and tested, and the mechanical performance of sandwich panel can be designed by optimal way. The debonding of core and skins may go with unpredictable way due to existence of many uncertain factors such as possible existence of cracks and defects initiated at fabrication of a panel, and unpredictable behavior of those cracks and defects under variations of temperature and climate conditions at utilization of the sandwich panel. Vibrations and impacts at fabrication and utilization may lead to unpredictable results and catastrophic bond failures as well.

To prevent the delamination of skins from core several technologies were suggested. One uses stiff Z pins inserted into core and slightly prolonged into skins thickness. This technology is described in U.S. Pat. Nos. 7,731,046 and 8,272,188. This technology is considered effective at some degree by comparison to glue bonding. But this technology does not allow using the full potential of high strength Z-pins due to a short length (a portion of millimeter) of Z pins inserted into skins. At flatwise tensile testing, Z pins are pulled out from skins and never being tensile broken.

Another technology includes stitching skins to core using strong yarns. This technology is disclosed a number of patents, including U.S. Pat. Nos. 4,256,790, 4,828,206, 5,308,228, 6,431,837, 7,393,577, 6,740,381, and 5,589,243. Boeing, in its U.S. Pat. No. 6,187,411 notes that a primary object using stitching sandwich technology is to receive improved flatwise tensile strength and substantially reduced damage propagation from impact.

U.S. Pat. No. 8,288,447 discloses expandable, thermally curable compositions useful as adhesives and structural reinforcement materials.

A major drawback of stitch-reinforced sandwich panels relates to the hole caused by the needle during stitching. As the space surrounding the stitching yarns cannot be left empty, resin is typically used to fill in the stitch holes. Nevertheless, use of resin causes overweight of the sandwich composites, thereby limiting its use in many industries.

SUMMARY OF THE INVENTION

In a search for novel methodologies for fabricating low-density structures, the present inventors have surprisingly uncovered a method of fabricating low-density polymeric microspheres, particularly thermoplastic polymeric microspheres, and more particularly thermoplastic expandable microspheres featuring the desired low-density and surface chemistry, which exhibit exceptional properties. The present inventors have fabricated foam prepared from the low density microspheres, for use in various technologies, including, but not limited to, sandwich panels.

According to one aspect of the present invention there is provided a composition-of-matter comprising a powder of thermoplastic expandable polymeric microspheres with a density below 15 kg/m$^3$.

According to some embodiments of the invention, the expandable microspheres are characterized as having a uniform density. In some embodiments, the uniform density being characterized as having at least 80% of the polymeric microspheres with densities that vary within a range of less than 20%. According to some embodiments of the invention, the uniform density is in the ranges of about 1 kg/m$^3$ to about 25 kg/m$^3$.

According to some embodiments of the invention, the expandable microspheres are characterized as having a uniform size. In some embodiments, the uniform size being characterized as having at least 80% of the polymeric microspheres with sizes that vary within a range of less than 20%.

According to some embodiments of the invention, the thermoplastic expandable microspheres are characterized as having glass transition temperature of up to about 250° C.

According to some embodiments of the invention, the thermoplastic expandable polymeric microspheres are selected from the group consisting of: polyvinylchloride, polyacrylonitrile, polyvinylidene chloride, polyimide, and any combination and/or derivative, and/or copolymer thereof.

According to some embodiments of the invention, the powder of the expandable polymeric microspheres is characterized as having a density of below 1 kg/m$^3$.

According to another aspect, there is provided process of preparing a composition-of-matter comprising expandable microspheres, the pre-expandable microspheres being thermoplastic expandable polymeric microspheres with a density below 15 kg/m$^3$, the process comprising the following steps sequentially: (a) subjecting the unexpanded microspheres to temperature that ranges from about 120° C. to about 180° C., for a time duration that ranges from about 2 minutes to about 10 minutes while stirring; and (b) cooling said microspheres to room temperature at a cooling rate of about 10° C. per min while stirring.

According to another aspect, there is provided a composition-of-matter comprising foam comprising the polymeric microspheres, the polymeric microspheres further being expanded and further being fused to each other in at least a portion thereof.

According to some embodiments of the invention, the foam is characterized by a density below 25 kg/m$^3$, wherein the density is characterized as being a uniform density, the uniform density being characterized as having at least 90% of the foam with densities that vary within a range of less than 15%.

According to some embodiments of the invention, the foam is characterized as having a density below 15 kg/m$^3$. According to some embodiments of the invention, the foam is characterized as having a density below 1 kg/m$^3$.

According to some embodiments of the invention, the composition-of-matter further comprises one or more stochastic fiber filaments. According to some embodiments, the stochastic fiber filaments are reinforcing fiber filaments, the reinforcing fiber filaments being aramid fiber filaments. According to some embodiments, the reinforcing fiber filaments are selected from the group consisting of: Kevlar, Nomex, carbon, glass, Poly(arylenebenzimidazole) (PABI), Poly(phenylenebenzobisoxazole) (PBO), Polybenzimidazole (PBI), and any combination thereof.

According to some embodiments of the invention, the foam and/or pre-expanded microspheres further comprise a conductive additive, the conductive additive comprising a material selected from the group consisting of: carbon, a conductive polymer, conductive metal particle, a magnetic metal particle, metal alloys, ceramics, a composite material and any mixture thereof. According to some embodiments, the material is characterized as having a size of at least one dimension thereof that ranges from about 1 nanometer to 1000 nanometers.

According to some embodiments, the carbon is in the form selected from the group consisting of: pristine carbon nanotubes, functionalized carbon nanotubes, multi walled carbon nanotubes, single walled carbon nanotubes, graphene, fullerene, carbon black, graphite, carbon fiber, and any combination thereof.

According to some embodiments, the conductive additive is in a form of a coating material on the foam and/or on the polymeric microspheres. According to some embodiments, the form of the coating material is characterized as having a form of porous networks. According to some embodiments, the form of the coating material is characterized as having a layer with a thickness that ranges from about 2 nm to about 500 nm. According to some embodiments, the form of the coating material is characterized as having a layer with a thickness that ranges from about 10% to about 200% of the thickness of the shells of the polymeric microspheres. According to some embodiments of the invention, the coating material is characterized as having weight that ranges from about 10 wt. % to about 200 wt. % of the weight of the polymeric microspheres and/or polymeric foam.

According to another aspect, there is provided a sandwich panel comprising: a first skin and a second skin; and foam. According to some embodiments the foam is a core, being located between the first and second skin. According to some embodiments, the core is stitched to the first skin and to the second skin using yarn beams. According to some embodiments, the yarn beams further comprise a resin. According to some embodiments, the foam fills a space surrounding the yarn beams.

According to some embodiments of the invention, the yarn is selected from the group consisting of: carbon, glass, aramid, PBI, PABI, PBO, polyimide, polyamide, Poly(ethylene terephthalate) (PET), and any combination thereof.

According to some embodiments of the invention, the sandwich panel further comprises a second foam of the invention, the second foam filling the space surrounding the yarn beams. According to some embodiments, the second foam is characterized as having a density of at least 30% higher than the density of the foam being located between the first and second skin.

According to some embodiments, the first skin and/or second skin further comprise a fibrous material and/or a resin. According to some embodiments, the yarn beams further comprise resin. According to some embodiments of the invention, the resin is selected from the group consisting of: phenolic, epoxy, polyetheretherketone (PEEK), polyimides, polyamides, bismaleimides, polyphenylene sulfide (PPS), polyphenylene oxide (PPO), polysulphone (PSU), Polybutylene terephthalate (PBT).

According to some embodiments of the invention, the fibrous material is selected from the group consisting of: carbon, glass, aramid, polybenzimidazole (PBI), polyimide, polyamide, PET, and any combination thereof.

According to some embodiments of the invention, the first skin and/or the second skin are coated with a material selected from the group consisting of: a metal, a composite, a ceramic, a polymer, and any combination thereof.

According to some embodiments of the invention, the foam is selected from the group consisting of: PVC foam, polyurethane (PU) foam, styrene acrylonitrile (SAN) foam, polyethylene, polyimide foam, phenolic foam, and polymethacrylimide (Rohacell) foam.

According to another aspect, there is provided a method of fabrication of the sandwich panel of the invention, the method comprising the steps of: stitching a first and a second skin to a core of foam using yarn, the foam having a density of below 25 kg/m$^3$ and comprising expandable polymeric microspheres; infiltrating thermoplastic expandable microspheres into the space surrounding the yarn; and heating the assembly to temperature that ranges from about 100° C. to about 285° C. to thereby expand and fuse the polymeric microspheres to the assembly.

According to some embodiments of the invention, the foam core is prepared from thermoplastic expandable microspheres being arranged uniformly in volume unit by methods that include, without limitation, shaking, vibration, rotation, utilizing fluidized bed, and combination thereof. According to some embodiments, the core of foam is reinforced with stochastic fiber filaments.

According to another aspect of the invention, there is provided a honeycomb comprising the foam and/or expandable microspheres of the invention. In some embodiments, the expandable microspheres at least partially fill either one or both sides, and part, or all cells of the honeycomb.

According to another aspect, there is provided an article of manufacture comprising the composition-of-matter, and/or foam as described herein.

According to some embodiments of the invention, the article of manufacture is in a form selected from the group consisting of: a sandwich structure, an electromagnetic interference (EMI) shielding, an anti-radar-shielding, an antenna, a circuit board, noise damping, aircraft engine nacelle structure, airframe structure, aerospace structure, heat-isolating structures, shock absorbent materials, blast resistance shielding, bullet and fragment resistance shielding, wind propellers, gas turbines, impact resistance structures, and marine structures.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Figure 1:
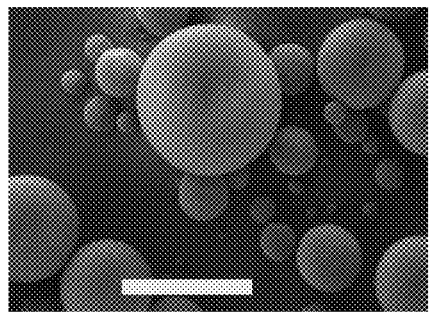
FIG. 1 is a scanning electron microscope (SEM) image illustrating the as-prepared powder of the pre-expanded microspheres, having an average density of about 10 kg/m$^3$; the bar line represents 200 microns.

The present invention, in some embodiments thereof, relates to low-density structures, and, more particularly, but not exclusively, to low-density polymeric microspheres, and methods of preparing same.

Before explaining at least one embodiment of the invention in detail, it is to be understood that the invention is not necessarily limited in its application to the details set forth in the following description or exemplified by the Examples.

Low-Density Microspheres According to some embodiments, there is provided a composition-of-matter comprising of polymeric microspheres.

As used herein and in the art, the term "polymer" refers to a macromolecule made of repeating monomer units.

The term "microsphere" as used herein is intended to encompass nanospheres, microspheres and also larger microsphere-like particles. Nanospheres generally have a diameter of 1000 nm or less. In some embodiments, the microsphere is about 10 to 2000 µm in diameter, as characterized by e.g., electron microscopy, such as scanning electron microscopy. In some embodiments, the microsphere is about 50 to 200 µm in diameter.

As known in the art, microspheres contain at least one radial pore. This means that the pores extend from the central part of the microsphere towards the surface, e.g., parallel to the radii of the microsphere. The pores may be tubular and interconnected. The radial pores provide the microspheres with a level of mechanical strength.

As used herein, the terms "polymeric microsphere" and "microsphere", used hereinthroughout interchangeably, refer to substantially spherical polymeric hollow particles.

In some embodiments, polymeric microspheres are thermoplastic expandable microspheres. The term "expandable" refers hereinthroughout to the capability of the microspheres to increase its volumetric dimension. Expandable microspheres are spheres comprising a thermoplastic shell encapsulating a low boiling temperature liquid hydrocarbon. When heated to a temperature high enough to soften the thermoplastic shell, the increasing pressure of the hydrocarbon will cause the microsphere to expand. The volume may increase by e.g., 60 to 80 times.

As known in the art, the term "thermoplastic microsphere" refers to polymeric microsphere, which includes any suitable material which is plastic or deformable, melts to a liquid when heated and freezes to a brittle, glassy state when cooled sufficiently. Once formed and cured, a thermoplastic polymer is typically suitable for melting and re-molding.

Examples of thermoplastic polymers that may also be employed include, but are not limited to, polyvinylchloride, polyacrylonitrile, polyvinylidene chloride, polyimide, and any combination and/or derivative, and/or modification and/or copolymer thereof. A thermoplastic polymer may be functionalized to have additional benefits that include, but not limited to, water solubility or dispersability.

In some embodiments, the thermoplastic expandable microspheres of the instant application are characterized as having glass transition temperature of e.g., up to about 80° C., up to about 100° C., up to about 130° C., up to about 150° C., about 200° C., about 250° C., about 300° C., about 400° C., about 450° C., about 500° C., about 550° C., or about 600° C., or any value therebetweeen.

In exemplary embodiments, the thermoplastic expandable microspheres are characterized as having glass transition temperature of up to about 250° C. As used hereinthroughout and in the art, the term "glass transition temperature" is the temperature at which an amorphous material (or in amorphous regions within semicrystalline materials) enters a reversible transition from a hard and relatively brittle state into a molten or rubber-like state.

In some embodiments, the thermoplastic expandable microspheres are pre-expanded polymeric microspheres. As used hereinthroughout, the term "pre-expanded" refers to the thermoplastic expandable microspheres, following a process as described hereinbelow, e.g., under "Process of Preparing Pre-expanded Microspheres", and as demonstrated in the Examples section that follows (e.g., Example 1 therein) aimed at reducing their density, and prior to their being used or processed in e.g., the molding equipment according to the invention.

In some embodiments, the pre-expanded polymeric microspheres are in a form of a powder. As used hereinthroughout and in the art, the term "powder" means finely dispersed solid particles.

In some embodiments, the pre-expanded polymeric microspheres are characterized as having a density of e.g., below 50 kg/m$^3$, below 40 kg/m$^3$, below 30 kg/m$^3$, below 25 kg/m$^3$, below 20 kg/m$^3$, below 15 kg/m$^3$, below 10 kg/m$^3$, below 5 kg/m$^3$, below 4 kg/m$^3$, below 3 kg/m$^3$, below 2 kg/m$^3$, or below 1 kg/m$^3$, including any value therebetween. In exemplary embodiments, the density of a powder of the pre-expanded thermoplastic microspheres is about 6 kg/m$^3$.

FIG. 1 shows a SEM image illustrating the as-prepared powder of the pre-expanded microspheres, having an average density of about 10 kg/m$^3$.

In some embodiments, the pre-expanded polymeric microspheres (or expandable microspheres) are expanded during processing which includes, but are not limited to, curing and heating. In the context of these embodiments of the present invention Expancel™ and Sekisui™ microspheres have processing temperature of up to about 200° C., and Matsumoto™ microspheres have processing temperature of up to 300° C. These temperatures render the microspheres and foam formed from these microspheres suitable for applications that include, without limitation, aerospace and electronics processing and utilizations.

In some embodiments, the pre-expanded polymeric microspheres are characterized as having a uniform density. The term "uniform density" is used herein to mean substantially homogeneous density. In some embodiments the uniform density is characterized as having at least 90% of the pre-expanded polymeric microspheres with densities that vary within a range of less than 10%. In some embodiments, the uniform density is characterized as having at least 90% of the pre-expanded polymeric microspheres with densities that vary within a range of less than 20%. In some embodiments, the uniform density is characterized as having at least 90% of the pre-expanded polymeric microspheres with densities that vary within a range of less than 30%. In some embodiments, the uniform density is characterized as having at least 80% of the pre-expanded polymeric microspheres with densities that vary within a range of less than 30%. In some embodiments, the uniform density is characterized as having at least 80% of the pre-expanded polymeric microspheres with densities that vary within a range of less than 20%. In some embodiments, the uniform density is characterized as having at least 80% of the pre-expanded polymeric microspheres with densities that vary within a range of less than 10%.

In some embodiments, the uniform density of the pre-expanded polymeric microspheres is about 30 kg/m$^3$, about 25 kg/m$^3$, about 20 kg/m$^3$, about 10 kg/m$^3$, about 5 kg/m$^3$, about 4 kg/m$^3$, about 3 kg/m$^3$, about 2 kg/m$^3$, about 1 kg/m$^3$, or any value therebetween. In some embodiments, the uniform density of the pre-expanded polymeric microspheres is below 1 kg/m$^3$.

In some embodiments, the uniform density of the pre-expanded microspheres is achieved any method known in the art of separating materials according to their density, by, for example, for example, using a liquid column with varying density, or/and using centrifuge.

In some embodiment, the uniform density of pre-expanded microspheres is achieved by pre-separation by density of the unexpanded microspheres, by any method known in the art, as described hereinthroughout.

Uniform Size Microspheres

In some embodiments, the pre-expanded polymeric microspheres are characterized as having a uniform size. The term "uniform size" is used herein to mean substantially homogeneous size. Size of pre-expanded microspheres means diameter of pre-expanded sphere.

In some embodiments the uniform size is characterized as having at least 90% of the pre-expanded polymeric microspheres with sizes that vary within a range of less than 10%. In some embodiments, the uniform sizes is characterized as having at least 90% of the pre-expanded polymeric microspheres with sizes that vary within a range of less than 20%. In some embodiments, the uniform size is characterized as having at least 90% of the pre-expanded polymeric microspheres with sizes that vary within a range of less than 30%. In some embodiments, the uniform size is characterized as having at least 80% of the pre-expanded polymeric microspheres with sizes that vary within a range of less than 30%. In some embodiments, the uniform size is characterized as having at least 80% of the pre-expanded polymeric microspheres with sizes that vary within a range of less than 20%. In some embodiments, the uniform size is characterized as having at least 80% of the pre-expanded polymeric microspheres with sizes that vary within a range of less than 10%.

In some embodiments, the uniform size of the pre-expanded polymeric microspheres is about 50 micron, about 60 micron, about 70 micron, about 80 micron, about 90 micron, about 100 micron, about 120 micron, about 140 micron, 160 micron, 180 micron, 200 micron, 220 micron, 240 micron, 260 micron, including any value therebetween. In some embodiments, the uniform size of the pre-expanded polymeric microspheres is above 260 micron.

In some embodiments, the uniform size of pre-expanded microspheres is achieved (or fabricated) by separating the desired microspheres by sizes using e.g., filtration using calibrated size filters.

Foam Structures

According to an aspect of some embodiments of the present invention, the processed pre-expanded polymeric microspheres form a foam structure.

As used herein, the terms "microsphere foam", "foam", or "foam structure", which are used hereinthroughout interchangeably, refer to a three-dimensional porous material having a reticulated configuration in cross section and which is pliable.

In some embodiments, the foam structure comprises polymeric microspheres being at least partially expanded. In some embodiments, the foam structure comprises polymeric microspheres being at least partially fused to each other.

In some embodiments, the density of the foam is below 30 kg/m$^3$, below 25 kg/m$^3$, below 20 kg/m$^3$, below 10 kg/m$^3$, below 5 kg/m$^3$, below 4 kg/m$^3$, below 3 kg/m$^3$, below 2 kg/m$^3$, or below 1 kg/m$^3$.

In some embodiments, the foam is characterized as having a uniform density. In some embodiments the uniform density is characterized as having at least 90% of the foam with densities that vary within a range of less than 10%. In some embodiments, the uniform density is characterized as having at least 90% of the foam with densities that vary within a range of less than 20%. In some embodiments, the uniform density is characterized as having at least 90% of the foam with densities that vary within a range of less than 30%. In some embodiments, the uniform density is characterized as having at least 80% of the foam with densities that vary within a range of less than 30%. In some embodiments, the uniform density is characterized as having at least 80% of the foam with densities that vary within a range of less than 20%. In some embodiments, the uniform density is characterized as having at least 80% of the foam with densities that vary within a range of less than 10%.

In some embodiments, the uniform density foam is fabricated using pre-expanded microspheres having a uniform density.

In some embodiments, the uniform density foam is fabricated using uniform sized pre-expanded microspheres.

In some embodiments, the uniform density is e.g., about 50 kg/m$^3$, about 30 kg/m$^3$, about 25 kg/m$^3$, about 20 kg/m$^3$, about 10 kg/m$^3$, about 5 kg/m$^3$, about 4 kg/m$^3$, about 3 kg/m$^3$, about 2 kg/m$^3$, about 1 kg/m$^3$, and any value therebetween. In some embodiments, the uniform density of the foam is below 1 kg/m$^3$.

In some embodiments, the foam comprises microspheres being fabricated following heating pre-expanded and/or expandable thermoplastic microspheres. In some embodiments, the foam comprises microspheres being fused without a separate binder.

In some embodiments, the foam comprises microspheres of polyurathene (PU), styrene acrylonitrile (SAN), polyvinyl chloride (PVC), polyacrylonitrile (PAN), Polyvinylidene chloride (PVDC), polyethylene, polyimide phenolic, and polymethacrylimide (Rohacell) or any copolymer thereof.

In some embodiments, the foam comprises microspheres derived from pre-expanded or expandable microspheres which include, but not limited to: Expancel™ microspheres, Sekisui™ microspheres, Matsumoto™ microspheres, Henkel™ microspheres, or Kutsho™ microspheres.

In some embodiments, the microsphere foam is reinforced with stochastic fiber filaments. In some embodiments, the stochastic fiber filaments are aramid fiber filaments. In some embodiments, the stochastic fibers are at a ratio (wt. %) of, e.g., about 0.1%, about 2%, about 5%, about 10%, about 12%, about 14%, about 16%, about 18%, about 20%, about 25%, about 30%, about 35%, about 50%, about 80%, or any value therebetween, of the foam.

As used hereinthroughout, the term "reinforcing fiber filament" or any grammatical diversions thereof, refers to a filamentary, band-shaped or strip-shaped or webbing structure, which alone is intended to impart the necessary rigidity and/or strength to the foam.

As known in the art, the mean fiber length of the reinforcing fiber filament is greater than the critical fiber length in the foam matrix, or the combination, employed.

In some embodiments, the reinforcing fiber filaments include, but not limited to, Kevlar, Nomex, carbon, glass, Poly(arylenebenzimidazole) (PABI), Poly(phenylenebenzobisoxazole) (PBO), Poly(benzimidazole) (PBI), and any copolymer or combination thereof. In some embodiments, the microsphere foam is reinforced with Kevlar 29 stochastic fiber filaments. In exemplary embodiments, the microsphere foam having a density of 25 kg/m$^3$ is reinforced with Kevlar 29 stochastic fiber filaments.

Figure 3:
FIG. 3 is a SEM image illustrating a fragment of a foam sample; the bar line represents 18 microns.

FIG. 3 presents a SEM image illustrating a fragment of a foam sample.

Conductive Additives

According to some embodiments of the present invention, the foam of the present invention further comprises conductive additives.

In the context of conductive additive, the terms "polymeric microspheres" or "microspheres" may refer to the pre-expended microspheres or to the microspheres of the foam.

In some embodiments, the conductive additive is uniformly dispersed within the polymeric microspheres. In some embodiments, the conductive additive is incorporated onto the expandable polymeric microspheres shells. In some embodiments, the additive (e.g., carbon nanotube) is located only on the microspheres' shells. In some embodiments, microspheres coated with conductive additives are processed to produce the foam with conductive additive.

In some embodiments, the conductive additives is infiltrated into capillaries of foam, forming conductive passes within capillaries of foam.

Conductive additives usable in the context of these embodiments of the present invention include, but not limited to, any conductive additives known in the art, e.g., electro conductive polymers, carbon fibers, carbon fiber veils, ceramics electro conductive and ferromagnetic nanoparticles.

In some embodiments, the term "conductive", or grammatical diversions thereof, refers to electrical conductivity of e.g., at least $10^{-7}$ S/m. In another embodiments, the term "conductive" refers to magnetic conductivity.

In some embodiments, microspheres coated with conductive additives are uniformly distributed within foam. In some embodiments, microspheres coated with conductive additives are layered distributed within foam.

In some embodiments, microspheres coated with conductive additives (e.g., carbon fiber veils) form or are arranged in two dimensional (2D) patterns within the foam. In some embodiments, microspheres coated with conductive additives form or is arranged in three dimensional (3D) patterns within the foam. In some embodiments, the conductive additives form 2D patterns within the foam. In some embodiments, the conductive additives form 3D patterns within the foam.

In some embodiments, microspheres coated with conductive additives are uniformly distributed within foam. In some embodiments, conductive additives are layered distributed within foam.

In some embodiments, the conductive additive comprises materials that include, but are not limited to, carbon, a conductive polymer, conductive fibers, carbon fibers, carbon fiber veils, conductive metal particle, a magnetic metal particle, metal alloys, ceramics, a composite material and any mixture thereof. In some embodiments, the conductive additives include, but are not limited to, gold, silver, copper, nickel, platinum, iron, cobalt and any combination thereof. In some embodiments, the materials are nanosized materials.

As used herein and in the art, the terms "nano", "nanosized", "nanomaterial" "nanotube", "nanoparticle", "nanoparticle composite", or grammatical diversions thereof, which are used herein interchangeably, refer to a property reflected by the particle size, and describe a particle featuring a size of at least one dimension thereof (e.g., diameter, length) that ranges from about 1 nanometer to 1000 nanometers.

In some embodiments, the size of the particle described herein represents an average size of a plurality of nanoparticle composites or nanoparticles.

In some embodiments, the average size (e.g., diameter, length) ranges from about 1 nanometer to 500 nanometers. In some embodiments, the average size ranges from about 1 nanometer to about 300 nanometers. In some embodiments, the average size ranges from about 1 nanometer to about 200 nanometers. In some embodiments, the average size ranges from about 1 nanometer to about 100 nanometers. In some embodiments, the average size ranges from about 1 nanometer to 50 nanometers, and in some embodiments, it is lower than 35 nm.

In some embodiments, the average size is about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 40 nm, about 42 nm, about 44 nm, about 46 nm, about 48 nm, or about 50 nm, including any value therebetween.

The particle can be generally shaped as a sphere, a rod, a cylinder, a ribbon, a sponge, and any other shape, or can be in a form of a cluster of any of these shapes, or can comprises a mixture of one or more shapes.

In some embodiments, the composition-of-matter comprises a plurality of nanoparticles, and at least 10%, 20%, 30%, 40%, 50%, 60%, 70%, 80%, 90%, 95%, 98%, 99%, 99.9%, or all of the nanoparticles are nanoparticle composites as in shape and average size.

In some embodiments, the carbon may be, without limitation, carbon fibers, carbon black, single, double and multi walls and/or pristine carbon nanotubes and/or, functionalized carbon nanotubes, carbon nanofibers, fullerene, graphene, graphite, carbon whiskers and any combination thereof.

A conductive additive usable in the context of some embodiments of the present invention includes carbon nanotubes. In the context of these embodiments of the present invention, carbon nanotubes gain particularly attention for a wide range of electronics applications due to their outstanding electrical properties, nano sizes and light weight. Carbon nanotubes have electrical conductivity comparable to copper, and can carry theoretically 1000 times more current density than e.g., cooper or silver. As known in the art, carbon nanotubes further have outstanding mechanical properties, e.g., strength in the range of about 11-100 GPa and modulus of about 1 TPa.

In some embodiments, the density of carbon nanotubes is in the ranges of, e.g., about 1.5 gr/cc to about 2.5 gr/cc. In some embodiments, the density of carbon nanotubes is in the range of 1.6-2.2 gr/cc.

As detailed hereinbelow under: "Process of Coating microspheres with Conductive Additive" according to an aspect of some embodiments of the present invention there is provided a process of preparing conductive foam.

As used hereinthroughout, the term "conductive foam" refers to the foam of the present invention, comprising a conductive additive.

Typically, but not exclusively, the conductive additive is dispersed in a medium not harmful to the shells of the microspheres. In some embodiments, the microsphere's shell is coated with the conductive additive. In some embodiments, the conductive additive forms a network structure on the shell of the microspheres.

In some embodiments, the conductive additive forms a coating on the foam.

In some embodiments, the conductive additive forms a coating within capillaries of the foam. In some embodiments, the conductive additive forms conductive passes within capillaries of the foam.

In some embodiments, the conductive additive forms a coating on the polymeric microspheres. In some embodiments, the conductive additive forms a coating having a porous network on the shell of the microspheres. In some embodiments, the conductive additive is further dispersed in the spaces of the voids between the microspheres.

In some embodiments, the conductive additive is characterized as having a layer with a thickness that ranges from about 1 nanometer to about 5000 nanometers. In some embodiments, the conductive additive is characterized as having a layer with a thickness that ranges from about 1 nanometer to about 1000 nanometers. In some embodiments, the conductive additive is characterized as having a layer with a thickness that ranges from about 2 nanometers to about 1000 nanometers. In some embodiments, the conductive additive is characterized as having a layer with a thickness that ranges from about 2 nanometers to about 500 nanometers.

In some embodiments, the conductive additive coating is formed on thin elastic shells of the microspheres. By "thin elastic shells" it is meant that the thickness of shells of large microspheres are with diameter of about e.g., 50 micron, about 100 micron, about 200 micron, about 300 micron, 500 micron and are less than e.g., about 400 nm, about 200 nm, about 100 nm, about 50 nm in size and are suitable to the sizes of conductive additive coating.

In some embodiments, the conductive additive coating is characterized as having a layer with a thickness that ranges from about 50% to about 1000% of the thickness of the shells of the polymeric microspheres. In some embodiments, the conductive additive coating is characterized as having a layer with a thickness that ranges from about 20% to about 1000% of the thickness of the shells of the polymeric microspheres. In some embodiments, the conductive additive coating is characterized as having a layer with a thickness that ranges from about 10% to about 1000% of the thickness of the shells of the polymeric microspheres. In some embodiments, the conductive additive coating is characterized as having a layer with a thickness that ranges from about 5% to about 1000% of the thickness of the shells of the polymeric microspheres. In some embodiments, the conductive additive coating is characterized as having a layer with a thickness that ranges from about 1% to about 1000% of the thickness of the shells of the polymeric microspheres. In some embodiments, the conductive additive coating is characterized as having a layer with a thickness that ranges from about 0.5% to about 500% of the thickness of the shells of the polymeric microspheres. In some embodiments, the conductive additive coating is characterized as having a layer with a thickness that ranges from about 5% to about 200% of the thickness of the shells of the polymeric microspheres. In some embodiments, the conductive additive coating is characterized as having a layer with a thickness that ranges from about 10% to about 200% of the thickness of the shells of the polymeric microspheres. In some embodiments, at least one network of conductive additive wire coated the shells of the microspheres.

In some embodiments, the shells of the microspheres have nanosized thickness.

In some embodiments, the conductive additive coats at least e.g., about 10%, about 20%, about 30%, about 40%, about 50%, about 60%, about 70%, about 80%, about 90%, including any value therebetween, of the surfaces of foam voids.

In some embodiments, the conductive additive forms a uniform and homogenously coating.

In some embodiments, the content of the conductive additive onto microspheres shells is e.g., at least 1%, at least 5%, at least 10%, at least 20%, at least 25%, at least 50%, about 100%, about 200%, about 500%, including any value therebetween, of the weight of the polymeric microspheres.

In some embodiments, the impedance of conductive coating is fabricated according to Direct Current (DC) requirements of an electronic device. In some embodiments, the impedance of conductive coating is fabricated according to Alternating Current (AC) requirements.

"DC" refers to a type of electricity transmission and distribution by which electricity flows in one direction through the conductor, usually relatively low voltage and high current. "AC" refers to a type of electrical current, the direction of which is reversed at regular intervals or cycles.

Further embodiments of this aspect of present embodiments are included hereinbelow, under the "Coating microspheres with Conductive Additive" and under the "Fabrication of Powder of microspheres Coated with the Conductive Additive", and form an integral part of embodiments relating to the conductive additive coating.

Multilayer Structures

As discussed hereinabove, currently known methodologies of stitching the core panel involve the undesirable increased overweight of the core panel, or lead to the formation of non-uniform density polymer foam. While conceiving the present invention, the present inventors have devised and successfully prepared and practiced a method of fabrication of multilayer structure comprising uniformly low-density expandable microsphere foams.

In an embodiment of the present invention, the multilayer structure is a sandwich panel comprising two skins stitched to a core of foam. In some embodiments the core is stitched to the first skin and to the second skin. In some embodiments, the multilayer structure is a sandwich panel comprising two skins stitched to foam core with yarn beams containing fiber filaments bonded together.

The terms "sandwich panel" and "sandwich stitched structure" are used hereinthroughout interchangeably.

The terms "foam", "microsphere foam" and "microsphere based foam" are used hereinthroughout interchangeably.

As used hereinthroughout, the terms "foam core", or "core of the foam", which are used herein interchangeably, refer to the foam being located between the first and the second skin.

In some embodiments, one or more of the skins in the sandwich panel are coated with a material that includes, without limitation, a metal, a composite, a ceramic, a polymer, and any combination thereof.

In some embodiments, the metal, ceramic, or the composite of the skin contain prefabricated drilled holes.

In some embodiments, at least one thin adhesive film is inserted between at least one the skin and at least one core.

In some embodiments, one or more of the skins of the sandwich panel further comprises a fibrous material. Exemplary fibrous materials include, without limitation, carbon, glass, aramid, polybenzimidazole (PBI), polyimide, polyamide, PET, and any combination thereof.

In some embodiments, there is space surrounding the yarn beams inside the foam core. In some embodiments, the space surrounding the yarn beams inside the foam core is filled with heat expandable thermoplastic microspheres. In some embodiments, the heat expandable thermoplastic microspheres are substantially devoid of resin.

In the context of the present invention, the sandwich panel comprises at least a first skin and a second skin and a core of the foam of the present invention.

Exemplary foams of the present invention include, but are not limited to, PVC foam, polyurethane (PU) foam, styrene acrylonitrile (SAN) foam, polyethylene, polyimide foam, phenolic foam, and polymethacrylimide (Rohacell) foam.

In some embodiments, the core of the foam is stitched to the first skin and to the second skin using yarn beams. In some embodiments, at least one of the yarn beams comprises yarns with elastic modulus e.g., at least 10 GPa, at least 20 GPa, at least 30 GPa, at least 40 GPa, at least 50 GPa, at least 60 GPa, at least 100 GPa, at least 200 GPa, at least 300 GPa, at least 400 GPa, at least 500 GPa, at least 600 GPa, or at least 700 GPa.

In some embodiments, the yarn is at a ratio (wt. %) of e.g., about 5%, about 10%, about 20%, about 25%, about 30%, about 35%, about 40%, about 45%, about 50%, about 55%, about 60%, about 65%, about 70%, about 75%, about 80%, about 85%, about 95%, or any value therebetween, of the foam core.

In some embodiments, the yarn is prepreg of yarns. As used herein the term "prepreg" is defined as fibrous material being pre-impregnated with a resin. Exemplary prepreg of yarns includes, without limitation, are non-sticky prepreg of yarns, sticky prepreg of yarns, flexible prepreg of yarns, partially crosslinking prepreg of yarns, partly cured thermoset resin prepreg of yarns. In some embodiments, the prepreg yarns exhibit improved flexibility of the yarn. In some embodiments, the prepreg yarns comprise non-sticky resin to be processed through sewing machine. In some embodiments, the prepreg yarns are coated with non-sticky coating to be processed through sewing machine.

In some embodiments, at least one of the yarn beams comprises yarns which include, but not limited to, carbon, glass, aramid, poly(benzimidazole) PBI, Poly(arylenebenzimidazole) (PABI), Poly(phenylenebenzobisoxazole) (PBO), polyimide, polyamide, Poly(ethylene terephthalate) PET, or any combination thereof.

In some embodiments, at least one of the yarn beams comprises a combination of yarns containing thermoplastic yarns.

In some embodiments, at least one of the yarn beams comprises fiber filaments. In some embodiments, the fiber filaments are thermoplastic fiber filaments.

In some embodiments, the yarn beams comprise yarns being attached to, or comprising a resin. Exemplary resins include, without limitation, an uncured thermoset resin, cured thermoset resin, thermoplastic resin, and a liquid crystalline resin. In some embodiments, the resin of yarn beams comprises a material that includes, but not limited to, phenolic, epoxy, polyetheretherketone (PEEK), polyimides, polyamides, bismaleimides, polyphenylene sulfide (PPS), polyphenylene oxide (PPO), polysulphone (PSU), Polybutylene terephthalate (PBT).

In some embodiments, at least one of the skins further comprises resin. In some embodiments, the resin of at least one of the skins is a cured thermoset resin. In some embodiments, the resin of at least one of the skins comprises a thermoplastic resin. In some embodiments, the resin of at least one of the skins comprises a liquid crystalline resin. Exemplary resins include, but not limited to, adhesive films and the protective sheets include, but not limited to, a phenolic, an epoxy, ampolyimide, a polyvinylchloride, a silicone, an amino, a polyester resin, a PEEK, PEKK, polyamide, polyether, polyester, PP, PE, mono or bismaleimides, polyethylenetereftalate, polyamide, polyamideimide, polyetherimide, polyparaphenylenesulfide, ABS, polysylfone, polyacrylonitrile, polyvinylidene chloride, a copolymer, or a blend, or a combination thereof. In some embodiments, at least one of the skins is impregnated with resin either before or after stitching said skins to the foam core. In some embodiments, at least one of the skins is fibrous prepreg before stitching said skins to the foam core. In some embodiments, at least one protective sheet is fibrous prepreg after stitching skins to the foam core.

In some embodiments the space surrounding the yarn beams is filled with the foam of the present invention. In some embodiments the space surrounding the yarn beams inside foam core is filled with the foam of the present invention, substantially without separate resin binder.

As used hereinthroughout, the term "second foam", in the context of the sandwich stitched structure, refers to the foam surrounding the yarn beams.

In some embodiments, the sandwich stitched structure is characterized as having second foam which is substantially or approximately the same as the foam core.

In some embodiments, the sandwich stitched structure is characterized as having second foam with a density that is lower than the density of the foam core. In some embodiments, the sandwich stitched structure is characterized as having second foam with a density that is higher than the density of the foam core. In some embodiments, the sandwich stitched structure is characterized as having second foam with a density that is e.g., at least 5%, at least 10%, at least 15%, at least 20%, at least 25%, at least 30%, at least 35%, at least 40%, at least 45%, at least 50%, at least 60%, at least 100%, at least 200%, at least 300%, at least 400%, at least 800% higher than the density of the foam core.

In some embodiments, the skin comprises ceramic, metal, fibrous composites or any combination thereof.

In some embodiments, at least one of the skins comprises a sheet. In some embodiments, the sheet is a protective sheet. Exemplary sheets include, but are not limited to, moisture protective sheet, an adhesive film sheet, a thermoplastic sheet, a metal sheet, a ceramic sheet, and a fibrous composite sheet, and any combination thereof. According to some embodiments of the invention, the protective sheets protects against water or moisture penetration into microspheres foam. In additional embodiments, the protective sheets protect against wind, sand erosion, and any factor that may destroy or change properties of microsphere foam within the needle pinched holes.

In some embodiments, the combination of the stitched skins and the protective sheets minimizes the effect of dislocation or destruction of yarns of fabrics during stitching. In some embodiments, the protective sheet is useful to strengthen the bonding of yarn beams to skins. In some embodiments, at least a part of a stitching yarn is located between the skins and/or the protective sheets. In some embodiments, at least one stitching yarn is supported with at least one protective sheet that does not have holes therein. In some embodiments, the protective sheets cover and protect needle pinched holes. In some embodiments, at least one pinched holes is filled with microsphere foam.

In some embodiments, a combination of skins and protective sheets are used with a thickness ratio of skins/protective sheets of e.g., about 100, about 40, about 20, about 10, about 5, about 1, about 0.5, about 0.1, about 0.05, about 0.02, about 0.01, including any value therebetween.

In some embodiments, the protective sheet is bonded to at least one skin. The term "bond" or any grammatical derivative thereof, as used herein, means adhere into at least one portion in a long lasting manner.

In some embodiments, the protective sheet seals the surface of the skin. In some embodiments, the protective sheet comprises, without limitation, any resin or fibrous material as described or exemplified herenthroughout. In some embodiments, the protective sheet comprises a prepreg of woven or non-woven material or a combination thereof.

Without been bound by any particular theory, it is assumed that a protective sheet being placed on the down face of the sandwich assembly prevents leaking the microspheres from needle pinched holes.

Further embodiments of this aspect of present embodiments are included hereinbelow, under the "Method of Fabricating Multilayer Structures", hereinbelow, and form an integral part of embodiments relating to the multilayer structure as described or exemplified hereinabove.

Figure 4:
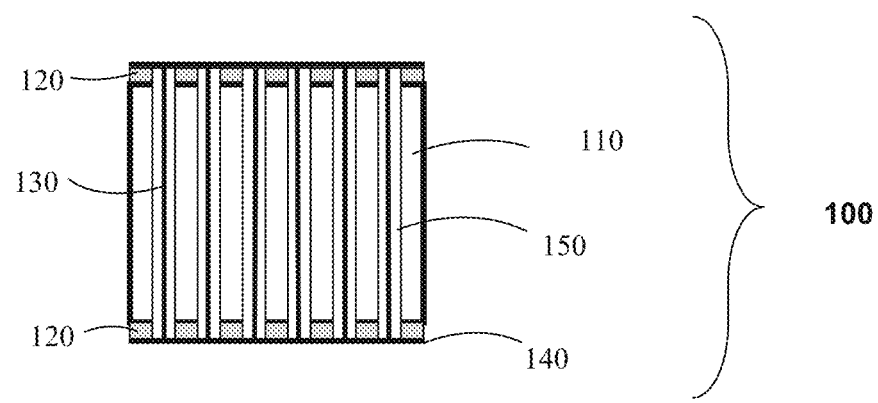
FIG. 4 is a schematic illustration of the invented sandwich panel after stitching, before filling with expandable microspheres.

Reference is now made to FIG. 4 which shows a general schema illustrating an embodiment of non-filled sandwich panel 100. "Non-filled sandwich panel" 100 refers to a sandwich after stitching, prior to filling thereof with expandable microspheres.

Non-filled Sandwich panel 100 may have a housing. The housing may be made of a rigid, durable material, such as, without limitation, aluminum, stainless steel, a hard polymer and/or the like.

Non-filled sandwich panel 100 may have foam core 110. Foam core 110 may contain one or more needle pinched holes. Non-filled sandwich panel 100 may have one or more skins 120. Skins 120 may contain needle pinched holes. Non-filled sandwich panel 100 may have yarn beams 130. Yarn beams 130 may be located in a core. Non-filled sandwich panel 100 may have one or more protective sheets 140. Protective sheet 140 may close the needle pinched holes. Non-filled sandwich panel 100 may have empty space 150. Empty space 150 may surround one or more elements of sandwich panel 100 e.g., yarn beams 130.

Embodiments of the structural elements of sandwich panel 100, e.g., "sandwich panel", "needle pinched holes", "skins", "protective sheet", "yarn beams" are described hereinthroughout.

Figure 5:
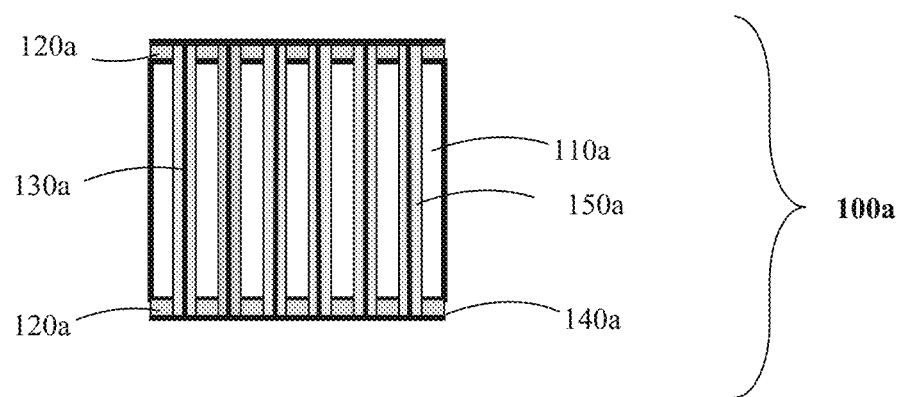
FIG. 5 is a schematic illustration of the invented sandwich panel after stitching and after filling with expandable microspheres.

Reference is now made to FIG. 5 which shows a general schema illustrating an embodiment of a filled sandwich panel 100a. "Filled sandwich panel" 100a refers to a sandwich panel after stitching and following filling thereof with expandable microspheres.

Filled Sandwich panel 100a may have a housing. The housing may be made of a rigid, durable material, such as, without limitation, aluminum, stainless steel, a hard polymer and/or the like.

Filled sandwich panel 100a may have foam core 110a. Foam core 110a may contain one or more needle pinched holes. Filled sandwich panel 100a may have one or more skins 120a. Filled sandwich panel 100a may have yarn beams 130a. Yarn beams 130a may be located in a core (e.g., a foam core). Filled sandwich panel 100a may have one or more protective sheets 140a. Protective sheets 140a may be located e.g., at a lower and/or an upper part of filled sandwich panel 100a so as to close the needle pinched holes (e.g., the needle pinched holes containing microspheres foam based on the disclosed expandable microspheres). Filled sandwich panel 100a may have space 150a. Space 150a may surround yarn beams 130a. Space 150a may contain fused thermo expandable microspheres. Thermo expandable microspheres may not contain a separate resin binder.

Embodiments of the structural elements of sandwich panel 100a, e.g., "needle pinched holes", "skins", "protective sheet", "yarn beams" are described hereinthroughout. Embodiments of thermo expandable microspheres (also referred to as "thermoplastic expandable microspheres") are also described herethroughout.

Figure 6:
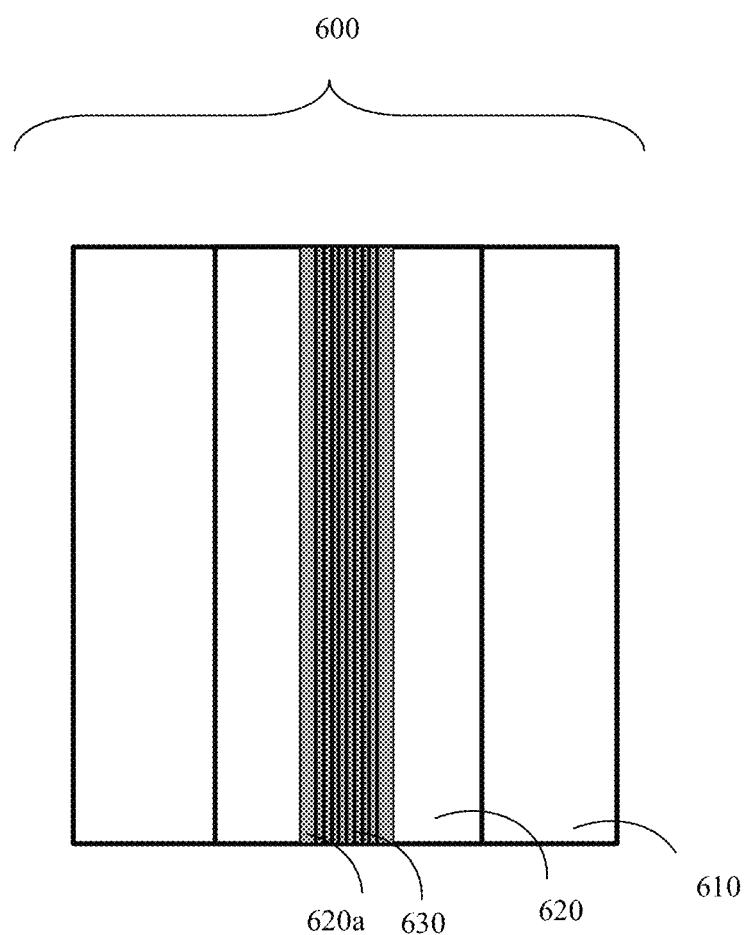
FIG. 6 is a schematic illustration of a fragment of an ordinary used core of stitched sandwich panels.

Reference is now made to FIG. 6 which shows a general schema illustrating a close view of a fragment of core 600 of stitched sandwich panels known in the art.

Core 600 may have foam core 610. Core 600 may have cured resin 620. Cured resin 620 may fill an outside space surrounding stitching yarn beams. This space (e.g., in the form of a hole) may be derived from penetrating a needle during stitching; Core 600 may have stitching yarns 630. Cured resin 620 may be located within stitching yarns (denoted as 620a). This resin bonds stitching yarns and forms stitching yarn beams.

Figure 7:
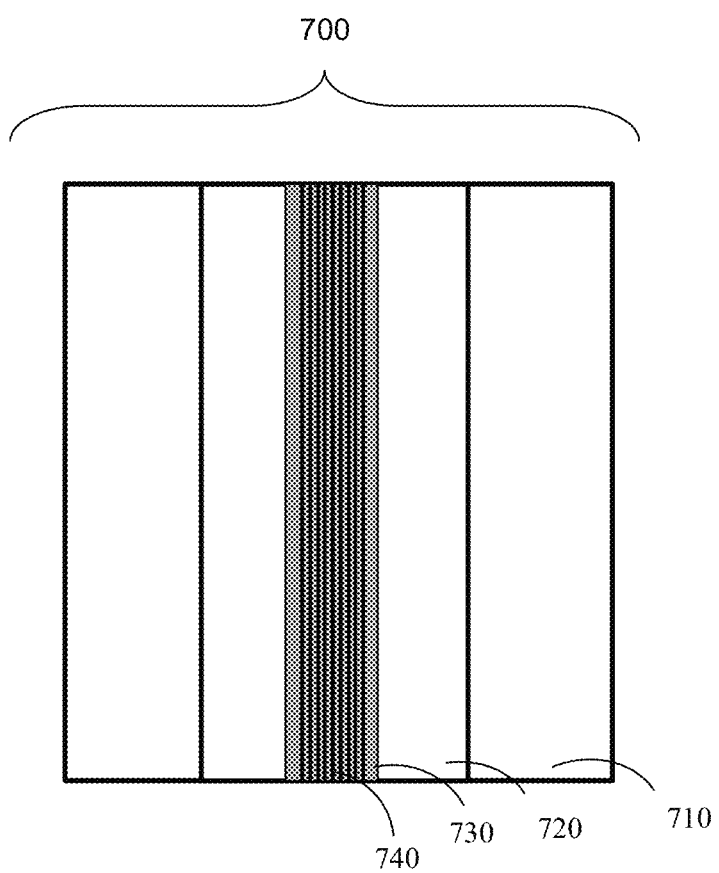
FIG. 7 is a schematic illustration of a fragment of a core of the invented stitched sandwich pane.

Reference is now made to FIG. 7 which illustrates a close view of a fragment of core 700 of the disclosed stitched sandwich panels.

Core 700 may have Foam core 710. Foam core 710 may be based on expandable microspheres 720. Expandable microspheres may fill an outside space surrounding stitching yarn beams. This space (e.g., in the form of a hole) may be derived from penetrating a needle during stitching. Core 700 may have cured resin 730. Core 700 may have stitching yarns 740. Cured resin 730 may be located within stitching yarns 740. Cured resin 730 may bond stitching yarns and forms stitching yarn beams.

Embodiments of the structural elements of Core 700 e.g., "stitching yarn beams", "expandable microspheres", "stitching yarns", and "stitching yarn beams" are described hereinthroughout.

Method of Fabricating Multilayer Structures

According to an aspect of some embodiments of the present invention there is provided a method of preparing multilayer structure(s).

Exemplary multilayer structures include, but are not limited to, sandwich panel, honeycomb structure, truss structure, corrugated structure, and 3D woven sandwich structure.

It is noteworthy that typically, the resin might cause overweight of composites, and therefore limiting their use is desirable in many applications.

The present inventors have devised and successfully prepared and practiced stable multilayer structures which do not necessitate a use of a resin. Nevertheless, in several embodiments of the present invention, as detailed herethroughout, the composition may still comprise resin. It is understood to one skilled in the art that by use of the foam and/or polymeric microspheres of the invention, the multilayer structures disclosed herein are in need of substantially lower amounts of resin as compared to multilayer structures without the foam and/or polymeric microspheres of the invention.

In some embodiments, a sandwich panel as described herein, in any of the embodiments thereof, including exemplary compositions-of-matter as described herein, is prepared by the steps of: stitching a first and a second skin to a core of foam using yarn to form an assembly; infiltrating expandable microspheres into the space surrounding the yarn; and heating the assembly. In some embodiments, the steps are performed sequentially. In some embodiments, the steps are not performed sequentially. In some embodiments, the foam is fabricated at the same stage with the stitching. In some embodiments, the expandable microspheres are the pre-expanded microspheres as discussed herethroughout.

As used herein, the terms "assembly" or "sandwich assembly" refer to a sandwich frame having multiple components or elements, or portions thereof, being fitted together, prior to setting the final form of the sandwich structure of the present invention.

In some embodiments, foam core is prepared from pre-expanded microspheres being arranged uniformly in volume unit. In some embodiments, the pre-expanded microspheres is arranged uniformly by methods that include, but not limited to, shaking, vibration, rotation, fluidized bed, and any combination thereof.

As used herein, the term "stitching" includes any type of sewing or needlework. In some embodiments, the stitching is fabricated by manual sewing methods known in the art. In some embodiments, the stitching is performed using sewing machines. In some embodiments, the sewing machine has multiply needles. In some embodiments, the sewing machine is combined with computer programs for higher accuracy of operation and high speed of production. In some embodiments, the sewing machine is robotic.

As known in the art, standard sewing industrial needles have diameter that ranges from e.g., about 1.5 to about 2.3 mm, while expandable microsphere have diameter that ranges from e.g., about 10 to about 200 micrometers.

In some embodiments, stitching needles coated with non-sticky coating are used.

Typically, the yarn stitching may be performed in various patterns including, but not limited to, different angles, different configurations and different architectures (e.g., pyramidal or diamond truss like configuration), in 2D or 3D space.

In some embodiments, the needle pinched holes in the foam core is derived from using a needle during stitching process. The present inventors have contemplated that expandable microspheres can fill the needle pinched holes within foam core using infiltration with the assistance of vibration, shaking tools, as described hereinbelow.

In some embodiments, the yarn may be any yarn as described or exemplified hereinabove under the "multilayer structures".

In exemplary embodiments, the yarn used for stitching skins to the core of the foam comprises Kevlar 29. In additional exemplary embodiments, the yarn used for stitching skins to the core of the foam comprises Kevlar 149. In additional exemplary embodiments, the yarn used for stitching skins to the core of the foam comprises carbon fiber. In additional exemplary embodiments, the yarn used for stitching skins to the core of the foam comprises carbon T 300 fiber. In some embodiments, the the carbon fiber is characterized by a modulus of e.g., at least 40 GPa, at least 80 GPa, at least 120 GPA, at least 140 GPA, at least 200 GPa, at least 300 GPa, at least 400 GPa, at least 600 GPa, or at least 700 GPa.

In some embodiments, the stitching yarn is impregnated with resin. In some embodiments, the stitching yarn is impregnated with resin before stitching the skin. In some embodiments, the stitching yarn is impregnated with resin after stitching the skin. In some embodiments, the yarn impregnated resin is at least partially cured. In some embodiments, the yarn is twisted. In some embodiments, the yarn is untwisted. In some embodiments, the yarn is untwisted prior impregnation and twisted after impregnation.

In some embodiments, yarn beams are characterized, without limitation, as having rigid fixed edges. In some embodiments, the yarn beam is located within the panel core. In some embodiments, a portion of yarn beam is located on the surface of the skin. In some embodiments, a unidirectional (UD) yarn beam is located within panel core.

In some embodiments, the UD yarn beam is arranged 90° to the skin to thereby maximize the flatwise compression and/or the tensile properties. In some embodiments, the UD yarn beam is arranged in the range of e.g., about 45°, about 60°, about 70°, about 80°, or about 90°, including any value therebetween, to the skin to thereby optimize the shear properties. In some embodiments, a portion of UD yarn beam is located on skins and bonded to surface of the skin. In some embodiments, a portion of UD yarn beam is located between skins and protective sheets and is bonded to surface of the skins and the protective sheets. In some embodiments, the yarn beams are arranged in 3D space such that desirable shear, and/or tensile and/or compression properties are exhibited.

In some embodiments, the space around the UD yarn beams within panel core is filled with the light density (LD) foam as described herein. In some embodiments, said LD foam is substantially the same as the panel core foam. In some embodiments, said LD foam is different from the panel core foam. The present inventors have contemplated that the LD foam imparts an elastic foundation for UD yarn beams located within the core, and/or significantly increases the buckling resistance of the UD yarn beams and/or the significantly increases the mechanical performance of sandwich panel at loading.

In some embodiments, slim yarn beams with long length and small cross section area are used, to thereby optimize the slenderness length and/or radius of the yarn beams.

In some embodiments, the infiltration of the expandable microspheres into the space surrounding the yarn is performed with assistance of a vibration tool. In some embodiments, the infiltration of the expandable microspheres into needle pinched holes in foam is performed with assistance of a vibration tool. In some embodiments, a vibration tool is used to vibrate the whole sandwich assembly. In some embodiments, the vibration tool vibrates the skins and the yarns. In some embodiments, the vibration tool vibrates the space surrounding the yarns. In some embodiments, the vibration tool may have frequencies that range from 0.5 Hz to 5000 Hz.

In some embodiments, an adhesive film is inserted between the skins and foam core before stitching processing. In some embodiments, the adhesive film comprises a non-sticky resin. In some embodiments, the adhesive film comprises sticky resin. In some embodiments, the adhesive film comprises any resin that includes, but not limited to, the resins yarn as described or exemplified hereinabove under the "multilayer structures". In some embodiments, the adhesive film bonds the skins to foam core. In some embodiments, the adhesive film seals the space between skins and foam core. In some embodiments, at least one of the skins is covered with at least one protective sheet after stitching processing.

The present inventors have contemplated another technological variant that uses frames that support skins against deflection during the stitching process. In some embodiments, the skins are fixed on frames. In some embodiments, yarns articles are used to stitch skins. In some embodiments, the profile of the frame is flat or complex. In some embodiments, the frame comprises cells from material similar to the foam between the skins or cells from honeycomb material for obtaining a better support to the skins from deflection.

In some embodiments, heating of sandwich assembly is performed. In some embodiments, the heating of sandwich assembly is performed to expand and fuse expandable microspheres. In some embodiments, the heating of sandwich assembly is performed at e.g., about 50° C., about 60° C., about 70° C., about 80° C., about 90° C., about 100° C., about 110° C., about 120° C., about 140° C., about 150° C., about 160° C., about 170° C., about 180° C., about 190° C., about 200° C., about 210° C., about 220° C., about 230° C., 240° C., about 250° C., about 260° C., about 270° C., about 280° C., about 290° C., 300° C., about 310° C., about 320° C., about 330° C., about 340° C., about 350° C., or any value therebetween.

In some embodiments, heating the sandwich assembly is performed to process the resin of skins. In some embodiments, the heating of sandwich assembly is performed to process the resin of adhesive films. In some embodiments, the heating of sandwich assembly is performed to process the resin of protective sheets. In some embodiments, the heating of sandwich assembly is performed to cure resins of sandwich assembly. In some embodiments, the heating of sandwich assembly is performed to melt thermoplastic components of sandwich assembly. In some embodiments, the heating of sandwich assembly is performed to bond skins to foam core. In some embodiments, the heating of sandwich assembly is performed to bond skins to foam core with assistance of adhesive films. In some embodiments, the heating of sandwich assembly is performed to bond protective sheets to skins. In some embodiments, the heating of sandwich assembly is performed in a closed mold. In some embodiments, the heating of sandwich assembly is performed in an open mold. In some embodiments, the heating of sandwich assembly is performed in a thin-walled tube shaped mold. In some embodiments, the heating of sandwich assembly is performed in a rectangular shaped mold.

In some embodiments, the heating of sandwich assembly is performed in a mold suitable for sandwich panel shape. In exemplary embodiments, the fusing of the expandable microspheres is performed without separate resin or a binder.

It is noteworthy that resin increases significantly weight. The density of a resin can be in range of e.g., about 1000 kg/m$^3$ to about 1300 kg/m$^3$, while the density of expandable microspheres related to the present invention is in the range of, e.g., about 5 kg/m$^3$ to about 50 kg/m$^3$. In exemplary embodiments, the density of expandable microspheres related to the present invention is in the range of 6 kg/m$^3$ to about 25 kg/m$^3$. In additional exemplary embodiments the density of expandable microspheres related to the present invention is in the range of about 1 kg/m$^3$ to about 25 kg/m$^3$.

It is also noteworthy, without being bound by any particular theory, that the use of mixture of expanded microspheres and resin may complicate the manufacturing process since, for example, the microspheres surfaces might be wettable with the resin, and resin might crash or might cause wrinkling of microspheres shells at the heating and cooling processes due to shrinkage of e.g., epoxy or phenolic resin.

It is further noted, without being bound by any particular theory, that the expandable microspheres heating creates positive pressure during their heating, supporting the yarn beams at curing process, while avoiding over-buckling conditions of the beams. The positive pressure effect at heating is of particular importance when using weak and low density foam that cannot support atmospheric pressure at wide used resin vacuum impregnation processing.

In some embodiments, the microspheres based foam core is reinforced with stochastic fiber filaments. In some embodiments, the stochastic fiber filaments have a fiber's length longer than fiber critical length within microsphere foam, such as the 3D long fibers as mentioned in U.S. Pat. No. 6,864,297. In some embodiments, the stochastic fiber filaments are in form of webbing with predominantly arranged fiber filaments in one direction. In some embodiments, the webbing fiber filaments are arranged predominantly perpendicular to sandwich skins. In some embodiments, the edges of stochastic fiber filaments are exposed and bonded to sandwich faces to thereby create bonding contacts between sandwich faces and fiber filaments. In some embodiments, the stochastic fiber filaments are aimed at enhancing the shear and flatwise tensile properties of the sandwich panel. In some embodiments, the edges of stochastic fibers are bonded directly to the skins.

Without being bound by any particular theory it is hypothesized that foams with densities below 25 kg/m$^3$, below 10 kg/m$^3$, below 5 kg/m$^3$, and below 1 kg/m$^3$ of the present invention have reinforcement effects for stochastic fibers in foam matrix distinguish from foam density of e.g., 100 kg/m$^3$. For example, shells of microspheres, characterized by density that ranges from of about 1 kg/m$^3$ to about 25 kg/m$^3$ are thinner and more elastic that may lead to better enveloping spherical microspheres shells around cylindrical fibers and hence exhibiting better physical contacts between the microspheres and the fibers. In case of very stiff microspheres shells, such as shell comprising glass, the contact area between the microspheres and the fibers may be as close as to a mathematical point. Therefore, while considering the reinforcement effect of the fibers one should take into consideration not only the macroscopic properties of the matrix but also the structure and the morphology in the micron level, and the sizes of the microspheres and the fibers.

The present inventors have contemplated that it is possible to combine the process of synthesis of foam and with the curing of the resin, or to separate the processes of foam formation and resin curing.

In some embodiments, expandable or pre-expanded polymeric microspheres are used to fabricate foam within empty spaces of various molds or honeycomb structures.

In some embodiments, the microspheres are poured into the empty spaces at the mold or honeycomb until e.g., about 10%, about 20%, about 30%, about 40%, about 50%, about 60%, about 80%, about 100%, of the empty space is filled. In some embodiments, the empty space is filled with assistance of a vibration tool.

In some embodiments, light density foam surrounding the fiber beams is fabricated. In some embodiments, the light density foam surrounding fiber beams is the same as the core foam.

The present inventors have contemplated utilizing another technological approach which involves a blowing method for fabricating the panel core.

In some embodiments of the blowing method the fabric skins are stitched one to another and encapsulated forming air hermetic bag. In some embodiments of the blowing method suitable gas is pressured between skins forcing skins to move one from another to thereby form air blowing structure. In some embodiments of the blowing method the expandable microspheres are further infiltrated into the air bag and then heated to expand the microspheres.

In some embodiments the expandable microsphere based foams as used herein can withstand high temperature. By "high temperature" it is meant temperature having a value that ranges from e.g., about 80° C. to about 700° C.

In some embodiments, the microspheres are mixed with water to fill the needle punched channels with microspheres, or fill space of a mold or honeycomb. In some embodiments the microspheres are subsequently dried from the water.

In some embodiments water solution with reduced surface tension is used. It is noteworthy that wrinkles of thin and weak microspheres shells of large size microspheres may be caused due to the high surface tension of water. Wrinkling may lead to reduced performance of microspheres. Hydrocarbon liquid, including, without limitation, n-butanol, n-butan, ethanol, and surfactants can be utilized to reduce surface tension of water.

In some embodiments, expandable microspheres are utilized while being mixed with additives which include, without limitation, flame retardants, smoke depressants, or any combination thereof.

In some embodiments, the quantity of the capillaries is reduced. As used herein "capillaries" refers to percolated pores between the fused microsphere foam.

In some embodiments, the quantity of the capillaries is reduced by performing the method of fabrication of sandwich panel, as described in the Example section.

In some embodiments, microspheres with approximately equal diameters are fabricated by using a size filtration method being applied on microspheres with wide size distribution. By "approximately equal diameters" it is meant equal diameter values with a margin of up to about ±20%.

In some embodiments, microspheres with approximately equal densities are fabricated using a density filtration method, for example liquid density column, being applied on microspheres with wide density distribution.

In some embodiments, size and density filtration methods are applied either to unexpanded and/or pre-expanded type of expandable microspheres.

In some embodiments, the microspheres of the present invention are formed from an expanded or unexpanded type of expandable microspheres, or a mixture thereof or a mixture of expanded and unexpanded type of expandable thermoplastic microspheres.

The invented sandwich panel of the present invention can be flat shaped or with a complex curvature shape. The invented sandwich panel of the present invention can be fully or partially covered with paint or/and protective layers.

The invented sandwich panels can be used for applications that include, without limitation, blast, impact resistance, noise damping, aircraft engine nacelle structure, fracture resistance, damage tolerance, and energy absorption applications. For better blast resistance sandwich panel can be assembled with additional additives, as noted hereinabove, which include, without limitation, ceramic or metals sheets.

Process of Coating Microspheres with Conductive Additive

According to an aspect of some embodiments of the present invention there is provided a process of preparing microspheres or microsphere foam which further comprises any one of the conductive additive as described hereinabove. In some embodiments, the shells of microspheres are coated with conductive additive. Typically, but not exclusively, the conductive additive are dispersed in a medium not harmful to the shells of the microspheres. In some embodiments, the conductive additive coats the shells of the microspheres. In some embodiments, the conductive additive forms a network structure on the shell of the microspheres. In some embodiments, the conductive additive is used to assist the fusing of the shells of the thermoplastic microspheres to thereby form foam. In some embodiments, the conductive additive is formed on thin elastic shells of the microspheres. In some embodiments, at least one network of conductive additive coats the shells of the microspheres. In some embodiments, the conductive additive forms a uniform and homogenously coating.

By "thin elastic shells" it is meant that the thickness of shells of large microspheres are with diameter of about e.g., 50 micron, about 100 micron, about 200 micron, about 300 micron, 500 micron and are less than about 100 nm in size and are comparable with the sizes of conductive additive coating.

In some embodiments, the shells of the microspheres have a nanosized thickness. In some embodiments, the conductive additive coats at least e.g., about 10%, about 20%, about 30%, about 40%, about 50%, about 60%, about 70%, about 80%, about 90%, about 90%, of the voids of surfaces of the foam.

In some embodiments, the conductive additive is further dispersed in the spaces between the voids of the microspheres of the foam. In some embodiments, the content of the conductive additive within the microspheres is e.g., at least 1%, at least 5%, at least 10%, at least 20%, at least 25%, at least 50%, at least 100%, at least 200%, at least 300%, by weight.

Dispersion liquid media usable according to some embodiments of the present invention include, but not limited to, an organic liquid, a non-organic liquid, a polar liquid, a non-polar liquid and liquid media with any combination thereof.

In some embodiments, the dispersion liquid may include, without limitation, a thixotropic liquid, a gel, colloid, suspension that is viscous under static conditions and flows when shaken or agitated or otherwise stressed. In some embodiments, the liquid medium wets microspheres shells. In some embodiments, the liquid medium diffuses into microspheres shells. In some embodiments, the liquid medium swells microspheres shells. In some embodiments, the dispersion of the conductive additive is processed in a liquid medium.

In some embodiments, the dispersion of the conductive additive is processed at a time—temperature regime in which the liquid medium wets the shells of the microspheres but do not dissolve the shells.

As used herein the term "dissolve" refers to the solubility as determined by either Hildebrand solubility parameter or the Hansen solubility parameter.

In some embodiments, the dispersion of the conductive additive (e.g., carbon nanotube) is processed at time—temperature regimes in which a liquid medium swells shells of microspheres but not dissolve the shells.

In some embodiments, the liquid medium has surface tension that ranges e.g., from about 10 dyn/cm to about 50 dyn/cm, from about 5 dyn/cm to about 60 dyn/cm, from about 1 dyn/cm to about 80 dyn/cm.

Exemplary liquid media include, but not limited to, ethyl ethanol, toluene, tetrahydrofuran, hexane, water, aqueous medium, water with a surfactant, and any combination thereof. In some embodiments, the liquid media further include trifluoro acetic acid.

Exemplary surfactants include, but not limited to, cationic, anionic ionic and non-ionic surfactant, short and long chain polymeric surfactants. Additional exemplary surfactants include, but not limited to, sodium dodecyl sulfate, sodium dodecyl benzene sulfonate, sodium Benzoate, Gum Arabic, Brij S-100, didodecyldimethylammonium bromide, Pluronic F-127, polyvinylpyrrolidone; vinylpyrrolidone, n-methyl-2 pyrrolidone, N,N dimethyl propylene, sodium cholate, sodium deoxycholate, Triton X-100, Triton X-405, Tween 60, pluronics surfactants, P123, F68, F108, F88, F127, hexadecyltrimethylammonium bromide, cetyl trimethylammonium bromide, Na-cholate, surfynol CT324, Aerosol OS, Dowfax 2A1.

In some embodiments, dispersants soluble or partially soluble are used. In some embodiments, the dispersants are not harmful to the shells of microspheres.

As used hereinthroughout, the term "not harmful" refers to the relevant standards determined by the vendor of microspheres, and/or to the standards known in the art.

In some embodiments, the conductive additive is conductive polymers. In some embodiments, the conductive additive is intrinsically conductive polymers soluble or partially soluble in liquids that are not harmful to the shell of microspheres.

Exemplary conductive polymers further include, but not limited to, polyacetylene, polypyrrole, polyaniline, poly (fluorene)s, polyphenylenes, polypyrenes, polyazulenes, polynaphthalenes, poly(pyrrole)s, polycarbazoles, polyindoles, polyazepines, polyanilines, poly(acetylene)s, poly(p-phenylene vinylene), poly(3-hexylthiophene), poly(thiophene)s, poly(3,4-ethylenedioxythiophene), poly(p-phenylene sulfide) or their copolymers, or their metal-doped form, and any combination thereof.

In some embodiments, the conductive polymers are characterized as having polymeric network. In some embodiments, the polymeric network comprises long chain polymer. In some embodiments, the polymeric network comprises long chain polymer and short chain surfactants. In some embodiments, the polymeric network is in the form of a gel.

In some embodiments, surfactant is used to reduce the surface tension of the water. In some embodiments, a water azeotrope is used to reduce surface tension of water. Exemplary azeotrope may include, but not limited to, water—n-butanol mixture. In some embodiments, the conductive additive is dispersed in a low viscous liquid medium.

In some embodiments, the conductive additive is dispersed in a high viscous liquid medium. In some embodiments, the conductive additive is dispersed in low viscous liquid containing microspheres.

In some embodiments, the liquid medium (e.g., organic liquid) is selected so as to disperse the additives (e.g., carbon nano tubes). In some embodiments, the method does not include use of surfactants, so as to avoid effects of surfactants on electrical percolation of the carbon nano tube additives.

In some embodiments, the organic liquid(s) is evaporated fully.

Without being bound by any particular theory, the activity of the liquid was selected to wet or slightly swell the shells of the microspheres, without dissolving the shells.

In some embodiments, the liquid in which the carbon nano tubes are dispersed have a similar Hildebrand solubility parameter to the polymeric shells of microspheres.

It is to note that, in some embodiments, the ratio of liquid to microspheres may be determined to affect wetted layers of liquid containing CNT around microspheres shells. The viscosity of the suspension may be controlled to prevented re-agglomeration of CNTs.

In some embodiments, the dispersion of the conductive additive in the liquid is assisted by e.g., ultrasonic irradiation, planetary mixer, a blender, a ball mill, or a combination thereof. Typically, ultrasonic irradiation is less suitable to apply on high viscosity medium, but it is suitable to use planetary mixing.

Fabrication of Powder of Microspheres Coated with the Conductive Additive

According to an aspect of some embodiments of the present invention, powder of the microspheres is coated with any of conductive additive as described hereinabove (e.g., nanoparticles or carbon nanotubes).

In some embodiments, unexpanded microspheres are coated with a conductive additive. In some embodiments, pre-expended microspheres are coated with nanoparticles. In some embodiments, a mixture of unexpanded and pre-expended microspheres is coated with nanoparticles. In some embodiments, the coating performed on unexpanded microspheres is followed with heat expansion. In some embodiments, the coating performed on pre-expanded microspheres is followed with heat expansion.

In some embodiments, the carbon nanotubes are dispersed in a liquid. In some embodiments, the dispersed carbon nanotubes and microspheres are mixed. In some embodiments, powder of microspheres is dispersed in low viscous liquid medium containing carbon nanotubes.

As exemplified in the Example section that follows, liquid medium with high surface tension may lead to shrinkage and wrinkling of microspheres. The observed shrinkage and wrinkling effects may diminish compression properties of microspheres. The shrinkage and wrinkling may be repaired by heating.

Typically, the volume liquid/microspheres ratio influences the viscosity of the suspension containing microspheres; suspension containing microspheres and liquid connected with microspheres is characterized by high viscosity; suspension with not packaged microspheres and free liquid (i.e. not connected to the microspheres) is characterized by low viscosity.

In some embodiments, the mixing of the microspheres and the liquid medium containing carbon nanotubes is assisted by methods that include, but not limited to, stirring, shaking, vibration, rotation, mill balls, blending, and high speed mixing. In some embodiments, the microspheres are immersed in the liquid containing dispersed carbon nanotubes without further mixing this suspension. In some embodiments, the microspheres are coated following an immersion.

In some embodiments, the suspension containing carbon nanotubes and microspheres is dried. In some embodiments, the suspension is dried by methods that include, but not limited to, heating, vacuum, filtration, centrifugation, removing the liquid medium by extraction. In some embodiments, the suspension is dried with the assistance of shaking. Typically, shaking may be performed at different frequencies, amplitudes, and configurations of basis motion.

In some embodiments, the carbon nanotubes may be coated fully or partially by electro conductive polymer molecules.

In some embodiments, at drying, the temperature of the liquid evaporation is below glass transition of microspheres. In some embodiments, the temperature of the evaporation is below the melt transition of the microspheres.

In some embodiments, after coating the shells of microspheres with carbon nanotubes, the non-coating carbon nanotubes are washed out by, e.g., a surfactant, a dispersant, or a combination thereof.

In some embodiments, the surfactant, dispersant, or any combination thereof, is further washed out with the assistance of another liquid, e.g., polar or non-polar liquid. In some embodiments, the surfactant, dispersant, or any combination thereof, is further washed out wash out with the assistance of e.g., sulfuric acid, nitric acid, ultrasonic irradiation, UV, an enzyme, or any combination thereof.

In some embodiments, the sulfuric acid, or the nitric acid, is in a concentration that ranges from about 1 to about 20, moles per liter (mol/L).

In some embodiments, the carbon nanotubes form a structure of e.g., thin coating, mono layers, on the shells of microspheres. In some embodiments, a network of carbon nanotubes is formed on the shells of microspheres. In some embodiments, the network of carbon nanotubes is in forms that included, but not limited to, spots of carbon nanotubes onto shells, dispersed individual carbon nanotubes, dispersed individual stretched carbon nanotubes, dispersed carbon nanotubes arranged with bundles of parallel carbon nanotubes.

In some embodiments, the electrical conductivity of the carbon nanotubes is improved by a formation of bundles of parallel oriented carbon nanotubes that are characterized by better contact between individual carbon nanotubes.

In some embodiments, the carbon nanotubes form a structure of mono layers, derived from e.g., Van-der-Waals interactions between the nanotubes and the polar molecules of the microspheres shells, to thereby form dispersed networks of the carbon nanotubes on the shells and to avoid agglomerations of particles.

In some embodiments, the networks of the dispersed conductive additive on the shells of microspheres lead to enhanced electrical conductivity of the microspheres.

In some embodiments, the networks of the dispersed conductive additive on the shells of microspheres lead to enhanced mechanical performance of the microspheres.

In some embodiments, carbon nanotubes are deposited on shells of microspheres in-situ, during synthesis of the carbon nanotubes. In some embodiments, the carbon nanotubes are in-situ deposited in a structure of networks of bundles of carbon nanotubes on the surface of the microspheres.

In some embodiments, the coating of microspheres is performed in special designed reactor. In some embodiments, the coating of the microspheres is performed directly in mold.

Typically, but not exclusively, when the coating of the microspheres is performed directly in mold, the liquid is dried in the mold to thereby fabricate the foam after the drying of the liquid without subsequent removal of the coated microspheres from mold.

Figure 2:
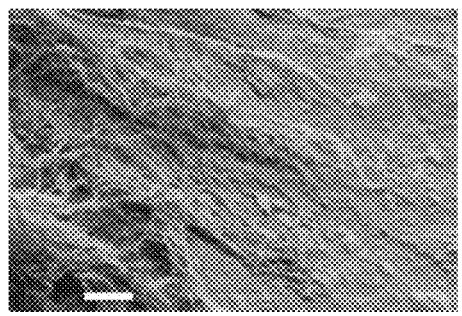
FIG. 2 is a SEM image illustrating a fragment of a pre-expanded microsphere coated with multiwall carbon nanotubes; the bar line represents 600 nanometers.

As demonstrated herein, a powder of microspheres coated with carbon nanotubes was fabricated. FIG. 2 shows a SEM image SEM image illustrating a fragment of a pre-expanded microsphere coated with multiwall carbon nanotubes.

In some embodiments, the quantity of the carbon nanotubes on the shells of microspheres varies in the powder.

In some embodiments, the conductive passes within are incorporated on the disclosed microspheres. In some embodiments, the foam comprises one or more conductive passes. In some embodiments, the conductive passes are incorporated within capillaries of the disclosed foam.

As described herein, in some embodiments, the foam is fabricated from pristine pre-expanded microspheres. As further described herein, in some embodiments, the foam is fabricated from pristine uniform density or uniform size pre-expanded microspheres. In some embodiments, the foam comprises fused spots between pristine microspheres.

In some embodiments, the dispersion of conductive nanoparticles is infiltrated into capillaries of foam. In some embodiments, the dispersion of conductive nanoparticles is deposited on the shells of microspheres.

In some embodiments, the dispersion of nanoparticles substantially does not penetrated fused spots of microspheres.

In some embodiments, conductive nanoparticles form a coating layer within the capillaries of the foam. In some embodiments, conductive nanoparticles form conductive passes within the capillaries of foam.

In some embodiments, 2D or 3D patterns of conductive passes of conductive nanoparticles within foam may be fabricated using a 3D printer. One cartridge may utilize pre-expanded microspheres and another ink/dispersion of nanoparticles. Ink may be dried before heat fusing of microspheres. In some embodiments, the impedance of conductive passes is fabricated according to DC or AC requirements Honeycomb Structure In some embodiments, the multilayer structure is in a form of a honeycomb. In some embodiments, the sandwich panel comprises a honeycomb.

As defined herein and further known in the art, honeycomb structures are of configurations that include, but not limited to, hexagonal, square, flex-core, double flex-core, spirally wrapped, cross-core, and tubular core.

In some embodiments, the honeycomb is fabricated from materials that include, but not limited to, metals, steel, aluminum, titanium, aramid fiber paper, carbon fiber paper and thermoplastics.

In some embodiments, the honeycomb comprises the polymeric microspheres of the present invention. In some embodiments, the honeycomb comprises the foam of the present invention.

In some embodiments, the polymeric microspheres at least partially fill at least one side of the honeycomb. In some embodiments, the polymeric microspheres at least partially fill both sides of the honeycomb. In some embodiments, the polymeric microspheres fill part, or all cells of the honeycomb. In some embodiments, the foam at least partially fills either one side of the honeycomb. In some embodiments, the foam at least partially fills both sides of the honeycomb. In some embodiments, the foam fills part, or all cells of the honeycomb.

In some embodiments of the present invention, cells of honeycombs are filled with light density microspheres. In some embodiments, the foam is formed within the honeycomb cells.

In some embodiments of the present invention, it is possible to fill the cells of honeycombs with pre-expanded or mixture of pre-expanded and expandable microspheres.

In some embodiments of the present invention, foam may be fabricated in the honeycomb placed in closed mold. In some embodiments, foam fabrication within cells of honeycomb and bonding of skins to honeycombs can be performed at once at the same temperature-time regimes, thereby simplifying the processing. In some embodiments, it is possible to fill the cells of honeycomb, partially by height, with non-expanded microspheres. In some embodiments, pre-expanded microspheres partially filling the cells of the honeycombs expand following heating and form foam. In some embodiments, the foam may have gradient of density in direction of its expansion.

In some embodiments, honeycomb filled with light density foam is characterized as having improved properties that include, but not limited to, noise damping, heat transfer and mechanical damage tolerance performance.

In some embodiments, the cells of the honeycomb are filled with coated conductive microspheres and conductive foam may be fabricated within the cells of the honeycombs. In some embodiments, foam may be formed partially within the volume of the honeycomb. In some embodiments, conductive foam may form uniform, layers, 2D or 3D conductive patterns within the volume of the honeycomb.

Process of Preparing Pre-expanded Microspheres

According to an aspect of some embodiments of the present invention there is provided a process of preparing low density pre-expanded expandable polymeric microsphere powder, obtained by processing expandable polymeric microspheres.

In some embodiments, the process comprises a step of heating expandable microspheres to temperature of e.g., about 80° C., about 100° C., about 120° C., about 140° C., about 160° C., about 180° C., about 200° C., about 220° C., about 240° C., about 250° C., about 280° C., about 300° C., about 320° C., about 340° C., about 400° C., or any value therebetween.

In some embodiments, the heating is performed for time duration of e.g., about 3 seconds, 30 seconds, about 1 minute, about 2 minutes, about 5 minutes, about 20 minutes, about 30 minutes, about 40 minutes, about 60 minutes, or any value therebetween. In some embodiments, the heating is performed while stirring.

In some embodiments, the process of preparing low density pre-expanded expandable polymeric microsphere powder comprises a subsequent step of cooling the expandable microspheres to temperature of about e.g., 80° C., about e.g., 70° C., about 60° C., about 50° C., about 40° C., about 30° C., about 20° C., about 10° C., or any value therebetween. In some embodiments, the cooling is performed while stirring.

In some embodiments, the cooling is performed in a cooling rate of e.g., about 5° C./minute, about 10° C./minute, about 15° C./minute, about 20° C./minute, about 25° C./minute, about 30° C./minute, about 35° C./minute, about 50° C./minute, or any value therebetween.

In some embodiments, the process of preparing low density pre-expanded expandable polymeric microsphere powder comprises a subsequent step of selecting the expandable microspheres according to size or/and density distribution.

In some embodiments, the step of selecting the expandable microspheres for distribution of sizes or/and densities is performed by methods that include, without limitation, shaking, vibration, rotation, using fluidized bed, filtration, centrifugation liquid density column, and any combination thereof.

In exemplary embodiments, the liquid density column comprises a mixture of water (e.g., 12.5 gram) and ethanol (e.g., 8.7 gram).

Articles of Manufacture

According to an aspect of some embodiments of the present invention there is provides an article-of-manufacturing which comprises the composition of matter as described herein. Any article that may benefit from the polymeric microspheres and/or foam of the compositions of matter described herein is contemplated.

Exemplary articles of manufacturing include, but are not limited to, a sandwich structure, an electromagnetic interference (EMI) shielding, an anti-radar-shielding, an antenna, an antenna, and a circuit board.

Additional exemplary articles of manufacturing include, but are not limited to, transportation structures, including, without limitations, noise damping, aircraft engine nacelle structure, sport cars, vibration and/or crack, impact resistance structures, airframe structure, and aerospace structure.

Additional exemplary articles of manufacturing include, but are not limited to, heat-isolating structures, damage tolerance structures, fracture resistance structures, blast resistance shielding, bullet and fragment resistance shielding.

Additional exemplary articles of manufacturing include, but are not limited to, compositions with thermoplastics, compositions with thermosets, underbody coatings, wall coatings, papers compositions, non-woven, filling of tennis balls, crack fillers, spackling compounds, sealant, concrete, paints, shoe soles, printing inks, genuine leather, cosmetics and the like.

Examples below demonstrate some invented technology approaches, some properties of invented sandwich panels with comparison of literature, open data as well as highlight the ideas and advantages of invention. The invention is not limited to the examples presented.

General

It is to be understood that the invention is not necessarily limited in its application to the details set forth in the following description or exemplified by the Examples. The invention is capable of other embodiments or of being practiced or carried out in various ways.

It is expected that during the life of a patent maturing from this application many relevant microsphere-based low-density structure will be developed and the scope of the term low-density structure is intended to include all such new technologies a priori.

As used herein the term "about" refers to ±10%

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials

Kevlar 29 yarns (170 tex; elastic modulus: 70 GPa); Ethanol; Phenolic resin; Epoxy glue Propoxy 20; 551 DE expandable polymeric hollow microspheres, xpancel Inc.; 093 DU120 expandable polymeric hollow microspheres, Expancel Inc.; Carbon T300 yarns (800 tex; elastic modulus: 230 GPa); Nanocyl 7000 pristine multi wall carbon nanotubes, Nanocyl Co.).

Example 1

Preparation of Pre-expanded Microspheres

Glass bottles with flat bottom were used as reactors to fabricate a powder of pre-expended microspheres (with a bulk density in the range of 5.6-15 kg/m$^3$).

In exemplary procedures, 0.5 grams of unexpanded microspheres (e.g., 093 DU120) were placed in a flat bottom bottle covered with aluminum foil deposited on a flat heating plate. The bottle was heated for a few minutes from temperature of about 140 to 180° C., while stirring with a magnetic stirrer. The powder was thereafter cooled on a cold plate while stirring. The bulk density of the powder of the microspheres was 5.6 kg/m$^3$.

In exemplary procedures, 0.5. gram of unexpanded microspheres 093 DU120 was placed in a 250 ml flat bottom bottle (65 mm diameter) covered with Aluminum foil. The bottle was deposited on a hot plate while stirring with a magnetic stirrer, and was heated from 120 to 180° C. for 3 minutes, and was thereafter cooled (at a cooling rate of about 10° C. per min) while stirring. Minor and weak agglomerates of microspheres were observed. The bulk density of the fabricated powder of the pre-expanded microspheres was about 5.9 kg/m$^3$.

In exemplary procedures, 1.5 gram of unexpanded microspheres 093 DU120 was placed in a 250 ml flat bottom bottle (65 mm diameter) covered with Aluminum foil. The bottle was deposited on a hot plate while stirring with a magnetic stirrer, and was heated from 135 to 160° C. for 3 minutes, and was thereafter cooled (at cooling rate of about 10° C. per min) while stirring. The bulk density of the fabricated powder of microspheres was 15 kg/m$^3$.

It is noteworthy that, as shown in SEM image in FIG. 1, some of the low density pre-expanded microspheres have sizes larger than 200-250 microns illustrating the very wide distribution of sizes for some accidental spot sample of pre-expanded powder of microspheres with bulk density about 10 kg/m$^3$.

As further demonstrated in FIG. 1 the powder of pre-expanded microspheres at bulk density of 10 kg/m$^3$ has some portion of microspheres with diameter about 200 microns. Microspheres having small diameters of a few dozen microns are further visible. It is assumed that these small microspheres were not expanded properly due to lack of internal quantity of gas encapsulated at preliminary synthesis by producer of microspheres. Small microspheres may contribute and significantly increase the density of microspheres foam.

In exemplary embodiments, the small microspheres were extracted from the powder, so as to prepare a powder comprising narrow fractions of large size microspheres.

In further exemplary embodiments, powder of pristine pre-expanded microspheres was further fabricated. Dry pre-expanded microspheres were filtrated with assistance of vibration and shaking through filter tubes center disc Pyrex 40 mm dia. 100-120 microns. Microspheres with diameters more than 100-120 microns were separated on filter surface and microspheres having less 100-120 microns diameters were infiltrated through filter.

Pristine foam based on microspheres with diameter more than 100-120 microns was fabricated according to Example 4 below. The thickness of the microspheres shells was estimated to be about 100 nm and bulk density of microspheres powder was estimated to be about 4 kg/m$^3$.

The pre-expanded microspheres characterization was performed on pre-expanded microspheres mixed with high surface tension liquid (water), moderate tension liquid (ethyl ethanol) and low surface tension liquid (n-hexane).

In exemplary procedures, ethyl ethanol, n-hexane, water were poured into powder of pre-expanded microspheres fabricated from commercial grade of unexpanded microspheres Expancel 093 DU 120. Unexpanded microspheres were heated and stirred into lab reactor within temperature range 120° C. to 160° C. for 3 minutes. Cooling was performed at 10° C. rate with continuous stirring. The bulk density of fabricated pre-expanded powder was about 6.7 kg/m$^3$. 1.3 gram of n-hexan, or ethyl ethanol or water was poured into 0.04 gram of pre-expanded powder.

The amount of 1.3 gram was selected since this is the maximum quantity of liquid that had filled the spaces between the microspheres without free liquid being found outside the powder.

The volume of each liquid was estimated according to the corresponding density: the density of water—1 g/cc, the density of n-hexane—0.65 g/cc, the density of ethanol—0.79 g/cc.

The following calculations are performed to evaluate the free space of the microspheres:

Bulk density of microspheres/density of water=0.0067
Bulk density of microspheres/density of n-hexane=0.01
Bulk density of microspheres/density of ethanol=0.0085
Volume water/bulk volume microspheres=(weight water/density water)/(weight microspheres/density microspheres)=0.21
Volume ethanol/bulk volume microspheres=0.28
Volume n-hexane/bulk volume microspheres=0.33

It is therefore assumed that free space between packed microspheres balls is in range about 30% to 40% (v/v) since the volume of n-hexane between microspheres is close to free space of packed spherical microspheres. The term "packed" and the values were taken from the known art for dense packed spheres.

It is noted that the microspheres are considered as having spherical shape. It is further noted that hexan is non polar liquid with low surface tension and poor interaction with microspheres shells, whereas water is polar liquid, has good interaction with microspheres shells and has high surface tension, and hence, the volume of the water was lower than the free space between packaged balls. It is assumed, without being bound by any particular theory, that the high surface tension of water squeezes the very thin elastic shells of microspheres.

Ethanol showed intermediate results between hexane and water.

It is further assumed, without being bound by any particular theory, that the bulk density of the microsphere powder filled out volume of the mold predetermines the density of the foam, while taking into the account the loss of some quantity of gas diffused out of microspheres shells during the heating process.

By mixture of water/methanol in a ratio of about 1.4 by weight (e.g., 12.5 gr of water and 8.7 gram of ethanol; ethanol was added to reduce the density of the liquid) the separation of the pre-expanded microspheres by density was observed: a portion of the microspheres floated whereas the other portion of the microspheres sunk in the mixture. It is assumed that water/ethanol ratio manages the lightness of floating portion of microspheres as floating microspheres are lighter and have larger diameters.

Foam samples were prepared on portions of floating and sunk microspheres after drying microspheres. Foam based on floated microspheres was characterized by a lighter density.

Drying Process of Suspensions of Fabricated Microspheres:

The drying of water from the corresponding microsphere suspension resulted in a slight shrunk of the microspheres and the microspheres remained slightly stuck to each other. The drying of hexane from the corresponding microsphere suspension did not result in the shrinking effect and the microspheres remained free and unstuck. The drying of ethanol from the corresponding microsphere suspension resulted in intermediate results between hexane and water.

Without being bound by any particular theory it is hypothesized that liquids with high surface tension squeezes the elastic thin shells of the microspheres and stuck them to each other after the drying process. In low surface tension liquids, on the other hand, allow the microspheres to remain unstuck.

It was therefore observed that suspending of the microspheres in water (i.e. liquid with high surface tension) had resulted in the shrinkage and wrinkling of microspheres. Taking into consideration that microspheres are practically ideal thin shell balls and their compression properties are determined by the buckling effects of the thin shells it can be concluded that observed shrinkage and wrinkling effects may diminish compression properties of microspheres. Shrinkage and wrinkling may be repaired at heat expansion of microspheres.

Example 2

Coating Pre-expanded Microspheres with Carbon Nanotubes

In exemplary procedures, the pre-expanded microspheres as prepared hereinabove were coated with multi wall carbon nanotubes (Nanocyl 7000 pristine multi wall carbon nanotubes produced by Nanocyl Co.).

In exemplary procedures, the coating was performed in n-hexane. In exemplary procedures, 1.6 g hexane was poured into 0.05 g pre-expanded microspheres. 0.025 g of the carbon nanotubes was then added. The suspension obtained was then mixed using high speed planetary mixer for 10 minutes at 800 rpm to 2500 rpm, while varying the speed every 1 minute.

FIG. 2 shows SEM image illustrating a fragment of a pre-expanded microsphere coated with multi wall carbon nanotubes.

Example 3

Fabricating Microsphere Foam

Pre-expanded microspheres as prepared hereinabove were poured into mold filling all its volume.

In exemplary procedures, the mold was next closed and was heated for 7 minutes at temperature in the ranges of 140° C. to 180° C., and was thereafter cooled at about 10° C.

Example 4

Preparation of Shaped Samples of Foam

Fabricating Low-density Microsphere Foam:

Cylindrical foam sample was fabricated using aluminum thin-walled tube molds with wall thickness of about 1.5 mm, internal diameter of about 22 mm and a length of about 50 mm.

One side of an aluminum tube mold was covered by 1 mm thickness aluminum plate. Pre-expanded microsphere powder with a density of 5.9 kg/m$^3$ was then poured into the tube with assistance of vibration to fill the tube space. Next, another side of the mold was covered with a thin aluminum plate as well. The tube mold was inserted into pre-heated hot oven with in-built air circulation "Memmert". The temperature was set at 191° C., being controlled with accuracy of ±3° C., for 16 minutes. The mold was thereafter cooled in air at a cooling rate of about 10° C. per min.

The foam sample obtained had a density of 5.2 kg/m$^3$.

A Rectangular Shape Foam Samples:

A rectangular shape foam samples with dimensions 10 mm×10 mm×20 mm were fabricated using an aluminum mold with wall thickness of about 10 mm.

In exemplary procedures, one side of the mold was covered with about 1 mm thickness aluminum plate. Prefabricated pre-expanded microspheres powder was poured into the tube with assistance of vibration to thereby fill the mold space. Another side of the mold was thereafter covered with thin aluminum plate as well. The mold was then heated using a hot press technique; the mold was placed between pre-heated hot plates and a thermocouple was inserted into the mold wall while registering the temperature to ranges of 146-179° C. for 10 minutes, at a heating rate of about 3° C. per min. The mold was thereafter cooled in air at a cooling rate of 10° C. per min. Foam samples with density range of 5-20 kg/m$^3$ were fabricated.

It is noteworthy, without being bound by any particular theory, that the density of the foam is predetermined by the weight of the powder within mold minus 8-12% to reduce the weight of gas diffusion from microspheres.

It is noteworthy, however, that the diffusion of the gas from microspheres is a function of many parameters and the exact quantity of reduce of weight is determined by experimental pre-trials. Typically, 8 to 10 minutes of heating results in reduce of about 8%-10% of weight and 15 to 20 minutes of heating results in reduce of about 12% to 10% of weight.

Cylindrical Foam Samples:

Cylindrical foam samples were fabricated using aluminum thin-walled tube mold with wall thickness about 1.5 mm, internal diameter was about 22 mm and length about 50 mm.

In exemplary procedures, one side of the tube was covered with aluminum plate (1 mm thickness) and pre-fabricated microsphere powder was poured into tube with assistance of vibration mean filling in the mold space.

The other side of the mold was then covered with thin aluminum plate as well and the mold was deposited in pre-heated hot oven with in-built air circulation "Memmert". The mold was then heated to 191° C. (±3° C.) for 10-20 minutes and was thereafter cooled down on air at a cool rate of about 10° C. per min.

The densities of the foam samples were in the ranges of: 5-20 kg/m$^3$.

The density of the foam was predetermined by the weight of the powder within mold minus 8-12%, so as to reduce the weight of gas diffusion from microspheres.

Morphological Characterization of the Fabricated Microsphere Foam:

A foam sample as prepared hereinabove was broken at room temperature and a fragment thereof was examined in high resolution scanning electron microscopy HR SEM Ultra Plus Gemini (Zeiss Co., Germany). Direct measurements were performed and no carbon or gold coating was applied.

FIG. 3 demonstrates HRSEM image of the foam sample, showing visible microsphere having a diameter of about 260 microns, and a broken microsphere with a diameter of about 170 microns. The thickness of the shell of broken microsphere is estimated as being below 100 nanometers.

Example 5

Sandwich Panel Preparation

Stitching Kevlar 29 Yarns to Bakelite Plates:

In exemplary procedures, the Kevlar 29 yarns were impregnated with 25 wt. % ethanol phenolic resin solution and dried for 24 hours at room temperature to evaporate the ethanol. After the treatment the yarns contained about 25 wt. % uncured phenolic resin.

In exemplary procedures, the flexible yarns containing the uncured phenolic resin were stitched manually through holes of two Bakelite plates fixed on the metal frame.

In exemplary procedures, for one set of the samples the height of the frame was 20 mm and for another set of the samples the height of the frame was 10 mm. The distance between the holes on the plates was 2.3 mm. The stitching yarns were arranged perpendicular to plates.

In exemplary procedures, the phenolic resin was next cured for 1 hour at 150° C., and the plates with the stiff fiber beams were separated from the frame. Thin (1 mm) layer of fast-curing epoxy glue Propoxy 20 was placed onto surfaces of the plates to fix the fiber beams to the surfaces of plates. The density of the core samples was evaluated as 0.045 g/cc.

Infiltrating microspheres into the space surrounding Kevlar 29 yarn beams and preparation the foam surrounding the yarn beams:

In exemplary procedures, the sample obtained was placed in a closed mold and expandable polymeric hollow microspheres Expancel 551 DE were poured into the closed mold and filled the space among the fiber beams. Once infiltrated, the assembly was heated in the closed mold to temperature of about 130° C. for 15 minutes. The microspheres were expanded and fused together, forming foam. The density of the microspheres based foam was 0.025 g/cc. The density of Kevlar fiber beams samples was evaluated as 0.045 g/cc. The overall density of the sample was 0.07 g/cc.

Preparation of the Foam:

In additional exemplary procedures, the pre-expanded microspheres Expancel 551 DE were poured into the closed mold and filled the whole volume of closed mold. The closed aluminum mold was heated in Lab-Line Duo-Vac Oven at a temperature of about 130° C. for 15 minutes. The microspheres were expanded and fused together, forming foam. The density of microspheres based foam sample was 0.025 g/cc. The mold was of cylindrical shape with internal diameter of 31 mm, outer diameter of 45 mm and length of 100 mm. The mold was closed with aluminum covers with 22 mm thick.

Stitching Carbon T 300 Yarns to Aluminum Plates:

In exemplary procedures, Carbon T 300 yarns were impregnated with 25 wt % ethanol phenolic resin solution and were thereafter dried for 24 hours at room temperature to evaporate the ethanol. After the treatment, the yarns contained about 25 wt. % phenolic resin. The Carbon yarns containing uncured phenolic resin were stitched manually through holes of two aluminum plates fixed on the metal frame. For one set of the samples the height of the frame was 20 mm and for another set of the samples the height of the frame was 10 mm.

In exemplary procedures, the stitching yarns were arranged perpendicular to plates. The distance between holes on plates was 3.6 mm. The phenolic resin was next cured for 1 hour at 150° C. and the plates with stiff fiber beams were separated from the frame. Thin (1 mm) layer of fast-curing epoxy glue Propoxy 20 was next placed onto surfaces of plates to fix fiber beams to the surfaces of plates.

The density of the core sample was evaluated as 0.075 g/cc.

Infiltrating Microspheres into the Space Surrounding T 300 Yarn Beams and Preparation the Foam Surrounding the Yarn Beams:

In exemplary procedures, the sample obtained was placed in a closed mold and expandable polymeric hollow microspheres, Expancel 551 DE, were poured into the closed mold and filled the space among fiber beams. Once infiltrated, the assembly was heated in the closed mold to a temperature of about 130° C. for 15 minutes to expand the microspheres and to fuse them together, forming foam.

The density of microspheres based foam supporting yarn beams was 0.025 g/cc. The density of carbon fiber beams samples was evaluated as 0.075 g/cc. The overall density of sandwich core sample was 0.1 g/cc.

Stitching Carbon T 300 Yarns through Foam Core to Glass Skins:

In exemplary procedures, Carbon T 300 yarns were impregnated with 25 wt. % ethanol phenolic resin solution and dried for 24 hours at room temperature to evaporate the ethanol. After the treatment the yarns contained about 25 wt. % phenolic resin.

In exemplary procedures, glass mat sheets with areal weight of 0.09 g/cm$^2$ and thickness of 1.5 mm were impregnated with 35 wt. % ethanol phenolic resin solution and dried for 24 hours at room temperature to evaporate the ethanol. Expandable polymeric hollow microspheres Expancel 551 DE were poured into a closed mold and filled (20 mm thick) the whole volume of the closed mold. The mold was then heated at about 130° C. for 15 min and microspheres were expanded and fused together, forming flat foam core. The microsphere based foam core (with thickness 20 mm) was placed between two glass sheets containing uncured phenolic resin. The glass skins were stitched to the foam core using the yarn containing uncured phenolic resin with a 2 mm needle. The distance between the stitches was 3.6 mm. The yarns were arranged perpendicular to faces. FIG. 4 demonstrates a general scheme of the invented sandwich panel after stitching, but before filling with expandable microspheres Example 6

Sandwich Panel Preparation: Infiltrating Microspheres into The Punched Hole

In exemplary procedures, the needle punched holes within foam core were filled with expandable polymeric microspheres Expancel 551 DE using vibration tool.

In exemplary procedures, the assembly and microspheres were thereafter heated in the closed mold. The microspheres in the punched holes were heated to temperature of about 130° C. for 15 minutes, and were shown to expand and become fused together, forming light density foam core within punched holes.

In additional exemplary procedures, the assembly was thereafter heated to 80° C. for 24 hours to fully curing of phenolic resin. Thin 1 mm layer of fast curing epoxy glue Propoxy 20 was then placed onto surfaces of faces to thereby fix fiber beams to the surfaces of faces.

FIG. 5 shows a general schema illustrating the invented sandwich panel after stitching and after filling with expandable microspheres FIGS. 6 and 7 show general schemes illustrating the fragment of core of currently known (FIG. 6) and the invented (FIG. 7) stitched sandwich panels.

Example 7

Physical Caracterization Of The Sandwich Panel

Density:

The density of core foam and foam within needle punched channels was 0.025 g/cc. The density of carbon fiber beams samples was evaluated as 0.075 g/cc. The overall density of sandwich core with carbon T300 beams was 0.1 g/cc. The density of Kevlar fiber beams samples was evaluated as 0.045 g/cc. The overall density of sandwich core with Kevlar 29 beams was 0.7 g/cc.

Compression Test:

Table 1 below shows the flatwise compression test data of the samples of the sandwich panels obtained in Example 5 hereinabove comparing with samples' properties currently known in the art and illustrates the compression data of the samples. The samples of the invention were based on Kevlar 29 and carbon T 300 yarns and had dimensions of 20 mm×20 mm and 20, and 10 mm thickness.

TABLE 1

| Material | Compression strength, MPa | Reference |
|---|---|---|
| Nomex honeycomb with density of 100 kg/m³ | 7.7 | [1] |
| Nomex honeycomb with density of 70 kg/m³ | 4.5 | [1] |
| Balsa wood with density 100 kg/m³ | 7.5 | [1] |
| Balsa wood with density 70 kg/m³ | 4.5 | [1] |
| Aluminum 5052 honeycomb with density of 100 kg/m³ | 6.0 | [2] |
| Aluminum 5052 honeycomb with density of 70 kg/m³ | 3.3 | [2] |
| The samples containing 3.4 vol. % carbon T300 yarn beams and the foam surrounding the beams. The height of core samples 20 mm. The density of the samples 100 kg/m³ | 6.7 | [3] |
| The samples containing 2.6 vol. % Kevlar 29 yarn beams and the foam surrounding the beams. The height of core samples 20 mm. The density of the samples 70 kg/m³ | 3.2 | [3] |
| The samples containing 3.4 vol. % carbon T300 yarn beams and the foam surrounding the beams. The height of core samples 10 mm. The density of the samples 100 kg/m3 | 9.0 | [3] |
| The samples containing 2.6 vol. % Kevlar 29 yarn beams and the foam surrounding the beams. The height of core samples 10 mm. The density of the samples 70 kg/m3 | 4.0 | [3] |

In Table 1: References are: [1] Baltek, 2002, ibid.; [2] Plascore, 2013, ibid.; [3] The present invention.

The data of the Technion's work was calculated based on the data for T300 yarn beams and Kevlar 29 yarn beams, and correlation with NASA data report for evaluation of stitched sandwich panels respectively.

Shear Test:

Table 2 below shows the shear properties of the samples as obtained in Example 5 hereinabove (based on perpendicular stitches to skins), comparing with the shear properties of samples currently known in the art. The samples of the current invention were based on Kevlar 29 and carbon T 300 yarns and had dimensions 20 mm×20 mm and 10 mm thickness.

TABLE 2

| Material | Shear strength, MPa | Shear modulus, MPa | Reference |
|---|---|---|---|
| Nomex honeycomb with density of 100 kg/m³ | 2.3 | 66 | [1] |
| Nomex honeycomb with density of 70 kg/m³ | 1.4 | 47 | [1] |
| Balsa wood with density 100 kg/m³ | 2.2 | 100 | [1] |
| Balsa wood with density 70 kg/m³ | 1.3 | 85 | [1] |
| Aluminum 5052 honeycomb with density of 100 kg/m³ | 3.5 | 680 | [2] |
| Aluminum 5052 honeycomb with density of 70 kg/m³ | 2.2 | 458 | [2] |
| NASA's sample - stitching technology evaluation report: 0.76 vol. % Kevlar 29 yarn beams; core height 25.4 mm; overall density of core - 138 kg/m3 | 2.4 | | [4] |
| NASA's sample - stitching technology evaluation report: 0.76 vol. % Kevlar 29 yarn beams; core height - 12.7 mm; overall density of core - 138 kg/m3 | 0.9 | | [4] |
| NASA's sample - stitching technology evaluation report: 0.38 vol. % Kevlar 29 yarn beams; core height - 25.4 mm; overall density of core - 91 kg/m3 | 0.5 | | [4] |
| NASA's sample - stitching technology evaluation report: 0.38 vol. % Kevlar 29 yarn beams; core height - 12.7 mm; overall density of core - 91 kg/m3 | 0.6 | | [4] |
| The sample containing 3.4 vol. % carbon T300 yarn beams; core height - 10 mm; overall density of core 100 kg/m3 | 1.4 | | [3] |
| The sample containing 2.6 vol. % Kevlar yarn beams; core height-10 mm; overall density of core 70 kg/m3 | 0.5 | | [3] |

References in Table 2: [1] Baltek Inc. Technical Info, 2002; [2] Plascore Inc. Technical Info, 2013; [3] The present invention; [4] Stanely et al., (NASA-CR 2001-21105, 2001)

The data of the Technion's work was calculated based on the data for T300 yarn beams and Kevlar 29 yarn beams, and correlation with NASA data report for evaluation of stitched sandwich panels respectively.

NASA data from Stanely et al., (NASA-CR 2001-21105, 2001) in the table were re-calculated to evaluate the overall density of core and to represent the data for the sandwich core. NASA core density was calculated by extracting weight of the sandwich panel with height 12.7 mm from the weight of the similar panel with height 25.4 mm. The difference was the weight of the sandwich core. Dividing the weight of the sandwich core on the volume of this sandwich core gave the density of the sandwich core.

Flatwise Tensile Test:

Table 3 below shows the flatwise tensile properties of the samples as obtained in Example 5 hereinabove, comparing with the flatwise tensile properties of samples currently known in the art.

TABLE 3

| Material | Flatwise tensile strength, MPa | Reference |
|---|---|---|
| Nomex honeycomb with density of 100 kg/m$^3$ | 4.0 | [1] |
| Nomex honeycomb with density of 70 kg/m$^3$ | 3.1 | [1] |
| Balsa wood with density 100 kg/m$^3$ | 7.9 | [1] |
| Balsa wood with density 70 kg/m$^3$ | 4.8 | [1] |
| Aluminum 5052 honeycomb with density of 128 kg/m$^3$ | 8.5 | [1] |
| Aluminum 5052 honeycomb with density of 192 kg/m$^3$ | 9.4 | [2] |
| NASA's sample - stitching technology evaluation report: 0.76 vol. % Kevlar 29 yarn beams; overall density of core - 138 kg/m3 | 10.3 | [4] |
| NASA's sample - stitching technology evaluation report: 0.38 vol. % Kevlar 29 yarn beams; overall density of core - 91 kg/m3 | 5.4 | [4] |
| Predicted data for the sample containing 3.4 vol. % carbon T300 yarn beams; overall density of core 100 kg/m3 | 56 | [3] |
| Predicted data for the sample containing 2.6 vol. % Kevlar 29 yarn beams; overall density of core 70 kg/m3 | 35 | [3] |

In Table 3 References are [1] Baltek 2002, ibid.; [2] Plascore 2013, ibid.; [3] The present invention; [4] Stanely, 2001, ibid.

The data of the Technion's work was calculated based on the data for T300 yarn beams and Kevlar 29 yarn beams, and correlation with NASA data report for evaluation of stitched sandwich panels respectively.

NASA data from Stanely et al., (NASA-CR 2001-21105, 2001) in Table 3 were re-calculated to evaluate the overall density of core and to represent the data for the sandwich core. NASA core density was calculated by extracting weight of the sandwich panel with height 12.7 mm from the weight of the similar panel with height 25.4 mm. The difference was the weight of the sandwich core. Dividing the weight of the sandwich core on the volume of this sandwich core gave the obtained the density of the sandwich core.

Tensile strength of the invented samples was evaluated by the following procedure: quantity of carbon and Kevlar yarn beams per surface area was multiplied by tensile strength of the beams The evaluations of the tensile properties of the sandwich panel samples were performed according to published data (e.g., Stanely et al., NASA-CR 2001-21105, 2001.

Without being bound by any particular theory, it can be concluded, based on Stanely et al., that the flatwise tensile properties of sandwich panel reinforced with fiber beams aligned perpendicular to skins are regulated by tensile properties of composite fiber beams themselves, and that the foam surrounding of fiber beams will not affect the tensile properties of sandwich panel.

Without being bound by any particular theory, it is noted that Stanely et al. teach that in case of an upper thread being located in the foam core and bobbin thread being located on the surface of the skin, the bobbin thread is stronger than upper thread. The upper thread plays a role in this case as a vertical fiber beam and bobbin thread as a rigid anchor to beam. Since high strength yarns are broken at flatwise tensile panel loading, the yarns within panel core should be stiffly fixed to skins to thereby provide the maximum contribution to the tensile properties of sandwich panel.

Example 8

Sandwich Panel Comprising Non-woven Webbing

Preparation Procedure:

In exemplary procedures, carbon T 300 yarns were impregnated with 25 wt. % ethanol phenolic resin solution and were thereafter dried for 24 hours at room temperature to evaporate the ethanol. After the treatment, the carbon yarns contained about 25 wt. % phenolic resin.

In exemplary procedures, glass mat sheets with areal weight 0.09 g/cm$^2$ and thickness 1.5 mm were impregnated in a phenolic resin containing bath.

In exemplary procedures, non-woven webbing of Kevlar 29 filaments was prepared at lab. Yarns from yarn bobbin were cut to 100 mm length and were combed with metal wire brushes forming 3D cotton like fiber webbing filaments structure. The webbing was placed in a closed aluminum mold having a rectangular configuration with width of 31 mm, thickness of 20 mm and length of 138 mm. Hollow microspheres 551 DE Expancel were poured in the closed mold to fill the space among webbing filaments with assistance of vibration mean. The volume of webbing was varied in range of 0.1-1.0 volume % of closed mold, to which the microspheres was inserted for dry infiltration. The microspheres were next heated at temperature of about 130° C. for 15 min in the closed mold and became expanded and fused together, forming foam. The microsphere based foam core (with thickness of 20 mm) was placed between the two glass sheets containing uncured phenolic resin. The surfaces of the core foam were treated with a glass paper to expose edges of webbing of single filaments. Phenolic resin was thereafter placed onto the surfaces of the core foam. Glass skins were then manually stitched to the foam core using the carbon yarn containing uncured phenolic resin and a 2 mm needle. The distance between the stitches was 3.6 mm. It is noteworthy that the 100 mm stochastic fiber filaments were not pulled out from the foam. The assembly was then placed into the closed mold. The needle pinched holes within foam core were infiltrated with the expandable polymeric microspheres using vibration tool. The assembly and microspheres were heated to about 130° C. in the closed mold and after 15 the microspheres in the pinched holes were expanded and fused together forming light density foam within the pinched holes. The assembly was further heated at 80° C. for 24 hours to fully cure the phenolic resin. Stitching yarns were aligned perpendicular to the glass skins. A thin layer (1 mm) of fast curing epoxy glue Propoxy 20 was thereafter placed onto glass skins to thereby fix the yarn beams to the glass skins.

The density of microspheres based foam supporting beams and containing Kevlar webbing was 0.025 g/cc. The Density of carbon fiber beams samples was evaluated as 0.075 g/cc. The overall density of sandwich core was 0.1 g/cc.

Characterization

Compression Strength and Elasticity of Uniform Size Microspheres Foam Compression strength was evaluated according to procedure of ASTM D1621 of American Society for Testing and Materials standard. The foam samples were of cylindrical shape with diameter about 22 mm and length about 22 mm with different densities and were tested for their compression strength using LLOYD Instruments LF Plus testing machine with maximum load 500 N. The data for compression strength vs. density for some foam samples are shown in the FIG. 8 which demonstrates compression strength vs. density for foams with ordinary wide distribution of microspheres sizes. Linear decrease of compression strength at decrease of density is observable. Foam samples based on Expancel 093 DU 120 microspheres became friable in the range of 6-5 kg/m³.

This effect may be derived from the lack of fusibility of largest size microspheres responsible to low density of foam. Compression modulus of foam cell is determined by $E \sim t^4/l^4$ according to Ashby and Gibson [Lorna J. Gibson and Michael F. Ashby; Cellular solids Structure and properties. $2^{nd}$ edition. Cambridge University Press], where E denotes modulus, t–thickness of cells and l is the length of cell.

In the instant case, compression strength of foam is determined by stress at 10% of foam deformation according to standard ASTM D1621-10. Thus, large sized microspheres give a major contribution to the compression performance of the foam as the weakest cell of the foam is considered in the above expression for elasticity of cell. Large sized microspheres have ability to be fused to form a foam.

Without fused spots, large size microspheres may form friable foam that is observable on a foam with density lower than 6 kg/m³. It means that the ability to expand even more and to fuse requires optimal large size of microspheres. Too large size microspheres lose the ability to expand more, to generate internal gas pressure and to fuse each other.

Extreme large microspheres can be heat-compressed by an outside pressure so as to be forced to fuse each other. External pressure may be generated outside the mold or inside the mold by inserting smaller size microspheres having the ability to generate pressure that will allow fusing large size microspheres.

Figure 8:
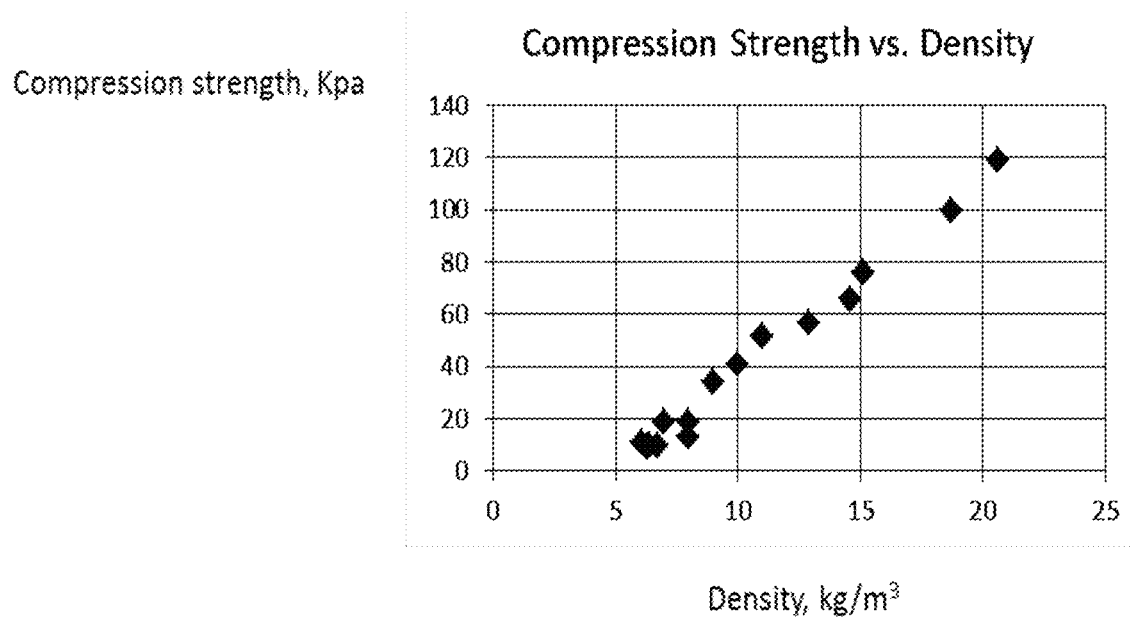
FIG. 8 is a dot graph representing data of the compression strength vs. the density of the foam samples.

For example, in FIG. 8 a foam having density of 10 kg/m³ has a compression strength of 40 KPa. When taking out the fraction of small microspheres from the precursor powder, the density of the foam can be reduced by X factor and reduce compression strength by Y factor. Y factor will be significantly less than X factor. That is, a remarkable reduction of density of more uniform size/density foam may be accompanied with a neglectable reduction of the mechanical performance.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A honeycomb comprising foam, said foam comprises expanded polymeric microspheres coated with a conductive additive, said polymeric microspheres being fused to each other in at least one portion thereof, said microspheres are limited to size variation of less than 15%, wherein said foam is characterized by a density below 15 kg/m³, wherein said density is characterized as being a uniform density, said uniform density being characterized as having at least 90% of said foam with densities that vary within a range of less than 15%, wherein said polymeric microspheres at least partially fill either one or both sides, and part, or all cells of said honeycomb, wherein said microspheres are coated with multiwall carbon nanotubes at said carbon nanotubes density of 1.5 gr/cc to 2.5 gr/cc.

2. The honeycomb of claim 1, wherein said polymeric microspheres are selected from the group consisting of: polyvinylchloride, polyacrylonitrile, polyvinylidene chloride, polyimide, and any combination and/or derivative, and/or copolymer thereof.

3. The honeycomb of claim 1, wherein at least 85% of said microspheres are further limited to length or diameter variation of 160 to 240 micrometers.

4. The honeycomb of claim 1, further comprising reinforcing fiber filaments.

5. The honeycomb of claim 4, wherein said fiber filaments comprise aramid fiber filaments.

6. The honeycomb of claim 1, wherein said honeycomb is fabricated from a composition comprising: a metal, steel, aluminum, titanium, aramid fiber paper, carbon fiber paper or a thermoplastic material.

7. The honeycomb of claim 1, wherein said conductive additive comprises a material selected from the group consisting of: carbon, carbon nanotubes, a conductive polymer, conductive metal particle, a magnetic metal particle, metal alloys, ceramics, a composite material and any mixture thereof.

8. The honeycomb of claim 7, wherein said composite material is characterized as having a size of at least one dimension thereof that ranges from about 1 nm to 1000 nm.

9. The honeycomb of claim 8, wherein said carbon is in the form selected from the group consisting of: pristine carbon nanotubes, functionalized carbon nanotubes, single walled carbon nanotubes, graphene, fullerene, carbon black, graphite, a carbon fiber, and any combination thereof.

10. The honeycomb of claim 1, wherein said carbon nanotubes comprise graphene.

* * * * *